(12) United States Patent
Sakurada et al.

(10) Patent No.: US 8,189,624 B2
(45) Date of Patent: *May 29, 2012

(54) COMMUNICATION SYSTEM, MANAGEMENT APPARATUS, COMMUNICATION APPARATUS AND COMPUTER PROGRAM

(75) Inventors: Hiroshi Sakurada, Tokyo (JP); Ken Sambu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 12/594,354

(22) PCT Filed: Apr. 4, 2007

(86) PCT No.: PCT/JP2007/057533
§ 371 (c)(1),
(2), (4) Date: Oct. 2, 2009

(87) PCT Pub. No.: WO2008/129593
PCT Pub. Date: Oct. 30, 2008

(65) Prior Publication Data
US 2010/0118721 A1    May 13, 2010

(51) Int. Cl.
*H04J 3/06* (2006.01)

(52) U.S. Cl. ...................................................... 370/503

(58) Field of Classification Search .................. 370/252, 370/258, 350, 403–405, 503, 509, 512; 375/354, 375/356; 709/203, 208; 713/375, 400
See application file for complete search history.

(56) References Cited

U.S. PATENT DOCUMENTS

| | | | |
|---|---|---|---|
| 6,370,159 B1 * | 4/2002 | Eidson | 370/503 |
| 7,379,480 B2 * | 5/2008 | Balasubramanian et al. | 370/516 |
| 7,649,912 B2 * | 1/2010 | Balasubramanian et al. | 370/509 |

(Continued)

FOREIGN PATENT DOCUMENTS

JP    2-5654    1/1990

(Continued)

OTHER PUBLICATIONS

Office Action issued May 12, 2011 in Chinese patent Application No. 200780052205.2 (with partial English translation).

(Continued)

*Primary Examiner* — Frank Duong
(74) *Attorney, Agent, or Firm* — Oblon, Spivak, McClelland, Maier & Neustadt, L.L.P.

(57) ABSTRACT

In a ring type network, a master node sends a measurement packet to a slave node; receives the measurement packet which has been circulated among a plurality of slave nodes; according to time-keeping of an internal clock; stores a sending time and a received time of the measurement packet; sends a measurement result notifying packet showing the sending time and the received time of the measurement packet to the slave node, and each slave node receives the measurement packet; sends the measurement packet received to the next node; according to time-keeping of the internal clock, stores a received time of the measurement packet; further receives a measurement result notifying packet; calculates a time correction value using the sending time and the received time of the measurement packet shown in the measurement result notifying packet received, the received time of the measurement packet stored, a total number of node apparatuses, and a difference between an order of the slave node and an order of the master node according to the packet transferring order, and corrects a time of the internal clock using the time correction value calculated.

15 Claims, 13 Drawing Sheets

U.S. PATENT DOCUMENTS 7,710,941 B2 * 5/2010 Rietschel et al. ............. 370/350

FOREIGN PATENT DOCUMENTS

| | | |
|---|---|---|
| JP | 5-167589 | 7/1993 |
| JP | 7-226756 | 8/1995 |
| JP | 8-18588 | 1/1996 |
| JP | 2002-247059 | 8/2002 |

OTHER PUBLICATIONS

D. Mills, Simple Network Time Protocol (SNTP) Version 4 for IPv4, IPv6 and OS1 RFC2030, Network Working Group, Oct. 1996, 12 pages.

U.S. Appl. No. 12/593,079, filed Sep. 25, 2009, Sakurada, et al.

* cited by examiner

COMMUNICATION SYSTEM, MANAGEMENT APPARATUS, COMMUNICATION APPARATUS AND COMPUTER PROGRAM

TECHNICAL FIELD

The present invention relates to a time synchronizing technique, for example, among a plurality of node apparatuses connected to a ring type network.

BACKGROUND ART

As conventional time synchronization protocol, NTP (Network Time Protocol) or IEEE 1588 is noted.

Further, in order to synchronize the time in the ring type network, a method to simply send the time of a node apparatus being a reference and adjust a local time to that time of the reference.

Further, another method is also proposed, in which processes are synchronized in the ring type network (Patent Document 1, for example).

Patent Document 1: JP2002-247059

In the time synchronization protocol of NTP or IEEE 1588, it is assumed that a request and a response are sent on the same route in the opposite directions with each other, so that when the request and the response are sent on different routes such as the ring type network, it is impossible to implement correct time synchronization.

Further, in the method of simply sending the time and adjusting to that time, because of influence of transmission delay or relay delay, etc., the set times may vary according to the location of the node apparatus within the ring.

Further, in the process synchronizing method of the ring type network such as Patent Document 1, a proposed synchronized time is obtained with considering the delay; however, variation of the time itself of the internal clock of each node apparatus is not considered.

One of main objects of the present invention is to solve the above problems, and a main object is, in the ring type network, to implement time synchronization with a high precision using a protocol in which it is assumed that packet transmission is done only in one direction.

BRIEF SUMMARY OF THE INVENTION

According to the present invention, in a communication system, in which a master node apparatus having a reference clock and a plurality of slave node apparatuses each having an internal clock are connected to form a ring, for circulating a packet among a plurality of node apparatuses by transferring the packet according to a packet transferring order prescribed for each node apparatus, the master node apparatus sends a measurement packet to a slave node apparatus being a receiver according to the packet transferring order, and receives the measurement packet which has been circulated among the plurality of slave node apparatuses;

according to time-keeping of the reference clock, stores a sending time of the measurement packet and a received time of the measurement packet;

generates a measurement result notifying packet showing the sending time of the measurement packet and the received time of the measurement packet; and sends the measurement result notifying packet generated to a slave node apparatus being a receiver according to the packet transferring order, and each of the plurality of slave node apparatuses receives the measurement packet from a node apparatus being a sender according to the packet transferring order, and sends the measurement packet received to a node apparatus being a receiver according to the packet transferring order;

according to time-keeping of the internal clock, stores at least either of a received time of the measurement packet and a sending time of the measurement packet; and receives the measurement result notifying packet from a node apparatus being a sender according to the packet transferring order; calculates a time correction value using the sending time of the measurement packet and the received time of the measurement packet shown in the measurement result notifying packet received, at least either of the received time of the measurement packet stored and the sending time of the measurement packet stored, a total number of node apparatuses, and a difference between an order of the slave node apparatus and an order of the master node apparatus according to the packet transferring order; and corrects a time of the internal clock using the time correction value calculated.

Each of the plurality of slave node apparatuses according the time-keeping of the internal clock, stores the received time of the measurement packet; and calculates the time correction value using the received time of the measurement packet stored, the sending time of the measurement packet and the received time of the measurement packet shown in the measurement result notifying packet received, the number of node apparatuses, and the difference between the order of the slave node apparatus and the order of the master node apparatus according to the packet transferring order; and corrects the time of the internal clock using the time correction value calculated.

The master node apparatus sends a structure confirming packet including a number-of-node count value for counting the total number of the node apparatuses to the slave node apparatus being the receiver according to the packet transferring order;

receives the structure confirming packet which has been circulated among the plurality of slave node apparatuses; and includes the number-of-node count value included in the structure confirming packet received as the total number of the node apparatuses in at least either of the measurement packet and the measurement result notifying packet, and sends the measurement packet and the measurement result notifying packet to the slave node apparatus being the receiver according to the packet transferring order, and each of the plurality of slave node apparatuses receives the structure confirming packet from the node apparatus being the sender according to the packet transferring order; counts up the number-of-node count value included in the structure confirming packet, and sends the structure confirming packet including the number-of-node count value after counting up to the node apparatus being the receiver according to the packet transferring order.

According to the present invention, in a communication system, in which a master node apparatus having a reference clock and a plurality of slave node apparatuses each having an internal clock are connected to form a ring, for circulating a packet among a plurality of node apparatuses by transferring the packet according to a packet transferring order prescribed for each of the plurality of node apparatuses, the master node apparatus sends a measurement packet to a slave node apparatus being a receiver according to the packet transferring order; and receives the measurement packet which has been circulated among the plurality of slave node apparatuses;

according to time-keeping of the reference clock, stores a sending time of the measurement packet and a received time of the measurement packet;

sends a delay calculating packet for obtaining a total sum of relay delay time at the plurality of slave node apparatuses to the slave node apparatus being the receiver according to the packet transferring order; and receives the delay calculating packet which has been circulated among the plurality of slave node apparatuses;

calculates an inter-node apparatus transmission delay time based on the total sum of the relay delay time at the plurality of slave node apparatuses shown in the delay calculating packet, the sending time of the measurement packet stored and the received time of the measurement packet stored, and a total number of node apparatuses;

generates a calculation result notifying packet showing the sending time of the measurement packet stored and the inter-node apparatus transmission delay time calculated; and sends the calculation result notifying packet generated to the slave node apparatus being the receiver according to the packet transferring order, and each of the plurality of slave node apparatuses receives the measurement packet from a node apparatus being a sender according to the packet transferring order; and sends the measurement packet received to a node apparatus being a receiver according to the packet transferring order;

according to time-keeping of the internal clock, stores a received time of the measurement packet and a sending time of the measurement packet;

receives the delay calculating packet from the node apparatus being the sender according to the packet transferring order; obtains an accumulated value of relay delay time at other preceding slave node apparatus according to the packet transferring order included in the delay calculating packet; and stores the accumulated value of the relay delay time obtained;

adds a time of a difference between the received time of the measurement packet stored and the sending time of the measurement packet stored to the accumulated value of the relay delay time included in the delay calculating packet to make a new accumulated value of the relay delay time; and sends the delay calculating packet including the new accumulated value of the relay delay time to the node apparatus being the receiver according to the packet transferring order; and receives the calculation result notifying packet from the node apparatus being the sender according to the packet transferring order; calculates a time correction value using the sending time of the measurement packet and the inter-node apparatus transmission delay time shown in the calculation result notifying packet received, at least either of the received time of the measurement packet stored and the sending time of the measurement packet stored, the accumulated value of the relay delay time stored, and a difference between an order of the slave node apparatus and an order of the master node apparatus according to the packet transferring order; and corrects a time of the internal clock using the time correction value calculated.

Each of the plurality of slave node apparatuses calculates the time correction value using the received time of the measurement packet stored, the sending time of the measurement packet and the inter-node apparatus transmission delay time shown in the calculation result notifying packet, the accumulated value of the relay delay time stored, and the difference between the order of the slave node apparatus and the order of the master node apparatus according to the packet transferring order.

According to the present invention, a management apparatus having a reference clock, forming a circulation route of a packet with a plurality of communication apparatuses, and circulating the packet on the circulation route according to a packet transferring order prescribed for each of the apparatuses, the management apparatus includes:

a measurement packet sending unit sending a measurement packet to a communication apparatus being a receiver according to the packet transferring order;

a measurement packet receiving unit receiving the measurement packet which has been circulated among the plurality of communication apparatuses;

a time memory unit, according to time-keeping of the reference clock, storing a sending time of the measurement packet by the measurement packet sending unit and a received time of the measurement packet by the measurement packet receiving unit;

a measurement result notifying packet generating unit generating a measurement result notifying packet showing the sending time of the measurement packet and the received time of the measurement packet stored in the time memory unit; and a measurement result notifying packet sending unit sending the measurement result notifying packet generated by the measurement result notifying packet generating unit to the communication apparatus being the receiver according to the packet transferring order.

According to the present invention, a management apparatus having a reference clock, forming a circulation route of a packet with a plurality of communication apparatuses, and circulating the packet on the circulation route according to a packet transferring order prescribed for each of the apparatuses, the management apparatus includes:

a measurement packet sending unit sending a measurement packet to a communication apparatus being a receiver according to the packet transferring order;

a measurement packet receiving unit receiving the measurement packet which has been circulated among the plurality of communication apparatuses;

a time memory unit, according to time-keeping of the reference clock, storing a sending time of the measurement packet by the measurement packet sending unit and a received time of the measurement packet by the measurement packet receiving unit;

a delay calculating packet sending unit sending a delay calculating packet for obtaining a total sum of relay delay time at the plurality of communication apparatuses to the communication apparatus being the receiver according to the packet transferring order;

a delay calculating packet receiving unit receiving the delay calculating packet which has been circulated among the plurality of communication apparatuses included in the circulation route, and in which the relay delay time at each of the plurality of communication apparatuses is accumulated and the total sum of relay delay time at the plurality of communication apparatuses is shown;

a transmission delay time calculating unit calculating an inter-communication apparatus transmission delay time based on the total sum of relay delay time at the plurality of communication apparatuses shown in the delay calculating packet received by the delay calculating packet receiving unit, the sending time of the measurement packet and the received time of the measurement packet stored by the time memory unit, and a total number of apparatuses included in the circulation route;

a calculation result notifying packet generating unit generating a calculation result notifying packet showing the sending time of the measurement packet stored by the time memory unit and the inter-communication apparatus transmission delay time calculated by the transmission delay time calculating unit; and a calculation result notifying packet sending unit sending the calculation result notifying packet generated by the calculation result notifying packet generating unit to the communication apparatus being the receiver according to the packet transferring order.

According to the present invention, a communication apparatus having an internal clock, forming a circulation route of a packet with a management apparatus having a reference clock and at least one other communication apparatus, and circulating the packet on the circulation route according to a packet transferring order prescribed for each of the apparatuses, the communication apparatus includes:

a measurement packet receiving unit receiving a measurement packet sent by the management apparatus from an apparatus being a sender according to the packet transferring order;

a measurement packet sending unit sending the measurement packet received by the measurement packet receiving unit to an apparatus being a receiver according to the packet transferring order;

a time memory unit, according to time-keeping of the internal clock, storing at least either of a received time of the measurement packet by the measurement packet receiving unit and a sending time of the measurement packet by the measurement packet sending unit;

a measurement result notifying packet receiving unit receiving a measurement result notifying packet showing, according to time-keeping of the reference clock of the management apparatus, a sending time of the measurement packet at the management apparatus and a received time of the measurement packet which has been circulated round the circulation route at the management apparatus;

a time correction value calculating unit calculating a time correction value using the sending time of the measurement packet and the received time of the measurement packet shown in the measurement result notifying packet, at least either of the received time of the measurement packet and the sending time of the measurement packet stored by the time memory unit, a total number of apparatuses included in the circulation route, and a difference of an order with the management apparatus according to the packet transferring order; and a clock controlling unit correcting a time of the internal clock using the time correction value calculated by the time correction value calculating unit.

The time memory unit, according to the time-keeping of the internal clock, stores the received time of the measurement packet by the measurement packet receiving unit, and the time correction value calculating unit calculates the time correction value using the received time of the measurement packet stored by the time memory unit, the sending time of the measurement packet and the received time of the measurement packet shown in the measurement result notifying packet, the total number of apparatuses included in the circulation route, and the difference of the order with the management apparatus according to the packet transferring order.

According to the present invention, a communication apparatus having an internal clock, forming a circulation route of a packet with a management apparatus having a reference clock and at least one other communication apparatus, and circulating the packet on the circulation route according to a packet transferring order prescribed for each of the apparatuses, the communication apparatus includes:

a measurement packet receiving unit receiving a measurement packet sent by the management apparatus from an apparatus being a sender according to the packet transferring order;

a measurement packet sending unit sending the measurement packet received by the measurement packet receiving unit to an apparatus being a receiver according to the packet transferring order;

a time memory unit, according to time-keeping of the internal clock, storing a received time of the measurement packet by the measurement packet receiving unit and a sending time of the measurement packet by the measurement packet sending unit;

a delay calculating packet receiving unit receiving a delay calculating packet including an accumulated value of relay delay time of other preceding communication apparatus according to the packet transferring order from the apparatus being the sender according to the packet transferring order;

a relay delay time memory unit obtaining the accumulated value of the relay delay time included in the delay calculating packet received by the delay calculating packet receiving unit, and storing the accumulated value of the relay delay time obtained;

a delay calculating packet updating unit adding a time of a difference between the received time of the measurement packet and the sending time of the measurement packet stored by the time memory unit to the accumulated value of the relay delay time included in the delay calculating packet to make a new accumulated value of the relay delay time, and storing the new accumulated value of the relay delay time in the delay calculating packet;

a delay calculating packet sending unit sending the delay calculating packet in which the new accumulated value of the relay delay time is stored by the delay calculating packet updating unit to the apparatus being the receiver according to the packet transferring order;

a calculation result notifying packet receiving unit receiving a calculation result notifying packet showing, according to time-keeping of the reference clock of the management apparatus, a sending time of the measurement packet at the management apparatus and an inter-communication apparatus transmission delay time;

a time correction value calculating unit calculating a time correction value using the sending time of the measurement packet and the inter-communication apparatus transmission delay time shown in the calculation result notifying packet, at least either of the received time of the measurement packet and the sending time of the measurement packet stored by the time memory unit, the accumulated value of the relay delay time stored by the relay delay time memory unit, a total number of apparatuses included in the circulation route, and a difference of an order with the management apparatus according to the packet transferring order; and a clock controlling unit correcting a time of the internal clock using the time correction value calculated by the time correction value calculating unit.

The time memory unit, according to the time-keeping of the internal clock, stores the received time of the measurement packet by the measurement packet receiving unit, and the time correction value calculating unit calculates the time correction value using the received time of the measurement packet stored by the time memory unit, the sending time of the measurement packet and the inter-communication apparatus transmission delay time shown in the calculation result notifying packet, the accumulated value of the relay delay time stored by the relay delay time memory unit, the total number of apparatuses included in the circulation route, and the difference of the order with the management apparatus according to the packet transferring order.

According to the present invention, a computer program makes a management apparatus having a reference clock, forming a circulation route of a packet with a plurality of communication apparatuses, and circulating the packet on the circulation route according to a packet transferring order prescribed for each of the apparatuses, execute:

a measurement packet sending process sending a measurement packet to a communication apparatus being a receiver according to the packet transferring order;

a measurement packet receiving process receiving the measurement packet which has been circulated among the plurality of communication apparatuses;

a time memory process, according to time-keeping of the reference clock, storing a sending time of the measurement packet by the measurement packet sending process and a received time of the measurement packet by the measurement packet receiving process;

a measurement result notifying packet generating process generating a measurement result notifying packet showing the sending time of the measurement packet and the received time of the measurement packet stored by the time memory process; and a measurement result notifying packet sending process sending the measurement result notifying packet generated by the measurement result notifying packet generating process to the communication apparatus being the receiver according to the packet transferring order.

According to the present invention, a computer program makes a management apparatus having a reference clock, forming a circulation route of a packet with a plurality of communication apparatuses, and circulating the packet on the circulation route according to a packet transferring order prescribed for each of the apparatuses, execute:

a measurement packet sending process sending a measurement packet to a communication apparatus being a receiver according to the packet transferring order;

a measurement packet receiving process receiving the measurement packet which has been circulated among the plurality of communication apparatuses;

a time memory process, according to time-keeping of the reference clock, storing a sending time of the measurement packet by the measurement packet sending process and a received time of the measurement packet by the measurement packet receiving process;

a delay calculating packet sending process sending a delay calculating packet for obtaining a total sum of relay delay time at the plurality of communication apparatuses to the communication apparatus being the receiver according to the packet transferring order;

a delay calculating packet receiving process receiving the delay calculating packet which has been circulated among the plurality of communication apparatuses included in the circulation route, and in which the relay delay time at each of the plurality of communication apparatuses is accumulated and the total sum of relay delay time at the plurality of communication apparatuses is shown;

a transmission delay time calculating process calculating an inter-communication apparatus transmission delay time based on the total sum of relay delay time at the plurality of communication apparatuses shown in the delay calculating packet received by the delay calculating packet receiving process, the sending time of the measurement packet and the received time of the measurement packet stored by the time memory process, and a total number of apparatuses included in the circulation route;

a calculation result notifying packet generating process generating a calculation result notifying packet showing the sending time of the measurement packet stored by the time memory process and the inter-communication apparatus transmission delay time calculated by the transmission delay time calculating process; and a calculation result notifying packet sending process sending the calculation result notifying packet generated by the calculation result notifying packet generating process to the communication apparatus being the receiver according to the packet transferring order.

According to the present invention, a computer program makes a communication apparatus having an internal clock, forming a circulation route of a packet with a management apparatus having a reference clock and at least one other communication apparatus, and circulating the packet on the circulation route according to a packet transferring order prescribed for each of the apparatuses, execute:

a measurement packet receiving process receiving a measurement packet sent by the management apparatus from an apparatus being a sender according to the packet transferring order;

a measurement packet sending process sending the measurement packet received by the measurement packet receiving process to an apparatus being a receiver according to the packet transferring order;

a time memory process, according to time-keeping of the internal clock, storing at least either of a received time of the measurement packet by the measurement packet receiving process and a sending time of the measurement packet by the measurement packet sending process;

a measurement result notifying packet receiving process receiving a measurement result notifying packet showing, according to time-keeping of the reference clock of the management apparatus, a sending time of the measurement packet at the management apparatus and a received time of the measurement packet which has been circulated round the circulation route at the management apparatus;

a time correction value calculating process calculating a time correction value using the sending time of the measurement packet and the received time of the measurement packet shown in the measurement result notifying packet, at least either of the received time of the measurement packet and the sending time of the measurement packet stored by the time memory process, a total number of apparatuses included in the circulation route, and a difference of an order with the management apparatus according to the packet transferring order; and a clock controlling process correcting a time of the internal clock using the time correction value calculated by the time correction value calculating process.

According to the present invention, a computer program makes a communication apparatus having an internal clock, forming a circulation route of a packet with a management apparatus having a reference clock and at least one other communication apparatus, and circulating the packet on the circulation route according to a packet transferring order prescribed for each of the apparatuses, execute:

a measurement packet receiving process receiving a measurement packet sent by the management apparatus from an apparatus being a sender according to the packet transferring order;

a measurement packet sending process sending the measurement packet received by the measurement packet receiving process to an apparatus being a receiver according to the packet transferring order;

a time memory process, according to time-keeping of the internal clock, storing a received time of the measurement packet by the measurement packet receiving process and a sending time of the measurement packet by the measurement packet sending process;

a delay calculating packet receiving process receiving a delay calculating packet including an accumulated value of relay delay time of other preceding communication apparatus according to the packet transferring order from the apparatus being the sender according to the packet transferring order;

a relay delay time memory process obtaining the accumulated value of the relay delay time included in the delay calculating packet received by the delay calculating packet receiving process, and storing the accumulated value of the relay delay time obtained;

a delay calculating packet updating process adding a time of a difference between the received time of the measurement packet and the sending time of the measurement packet stored by the time memory process to the accumulated value of the relay delay time included in the delay calculating packet to make a new accumulated value of the relay delay time, and storing the new accumulated value of the relay delay time in the delay calculating packet;

a delay calculating packet sending process sending the delay calculating packet in which the new accumulated value of the relay delay time is stored by the delay calculating packet updating process to an apparatus being the receiver according to the packet transferring order;

a calculation result notifying packet receiving process receiving a calculation result notifying packet showing, according to time-keeping of the reference clock of the management apparatus, a sending time of the measurement packet at the management apparatus and an inter-communication apparatus transmission delay time;

a time correction value calculating process calculating a time correction value using the sending time of the measurement packet and the inter-communication apparatus transmission delay time shown in the calculation result notifying packet, at least either of the received time of the measurement packet and the sending time of the measurement packet stored by the time memory process, the accumulated value of the relay delay time stored by the relay delay time memory process, a total number of apparatuses included in the circulation route, and a difference of an order with the management apparatus according to the packet transferring order; and a clock controlling process correcting a time of the internal clock using the time correction value calculated by the time correction value calculating process.

EFFECT OF THE INVENTION

According to the present invention, a time correction value is calculated by estimating delay from the master node apparatus to the slave node apparatus based on the delay time of one cycle of the ring, the delay time is actually measured in circulating a measurement packet among a plurality of slave node apparatuses, so that the time synchronization with a high precision can be implemented.

DETAILED DESCRIPTION OF THE DRAWINGS

Embodiment 1

Figure 1:
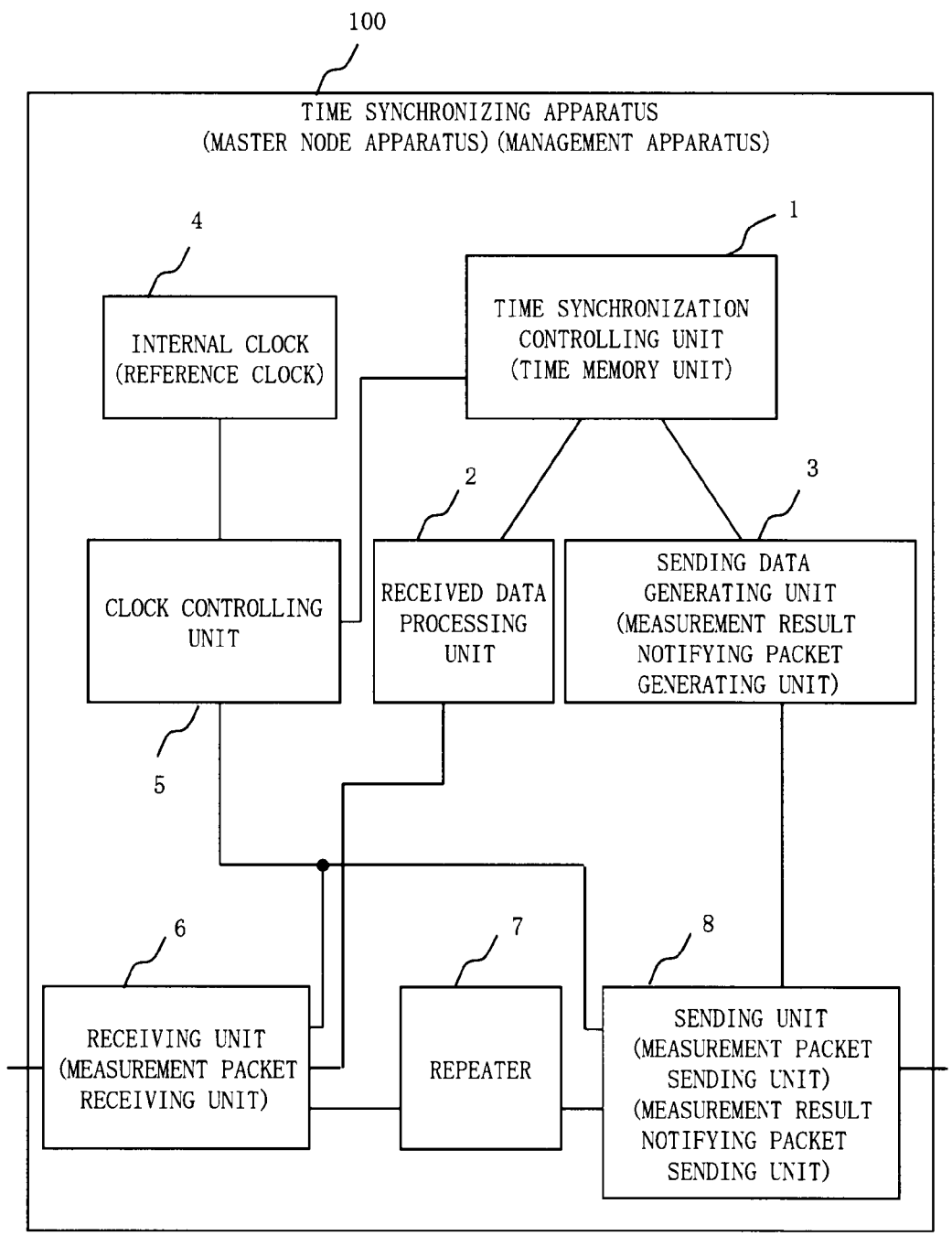
FIG. 1 shows a configuration example of a time synchronizing apparatus as a master node according to the first embodiment.
Figure 2:
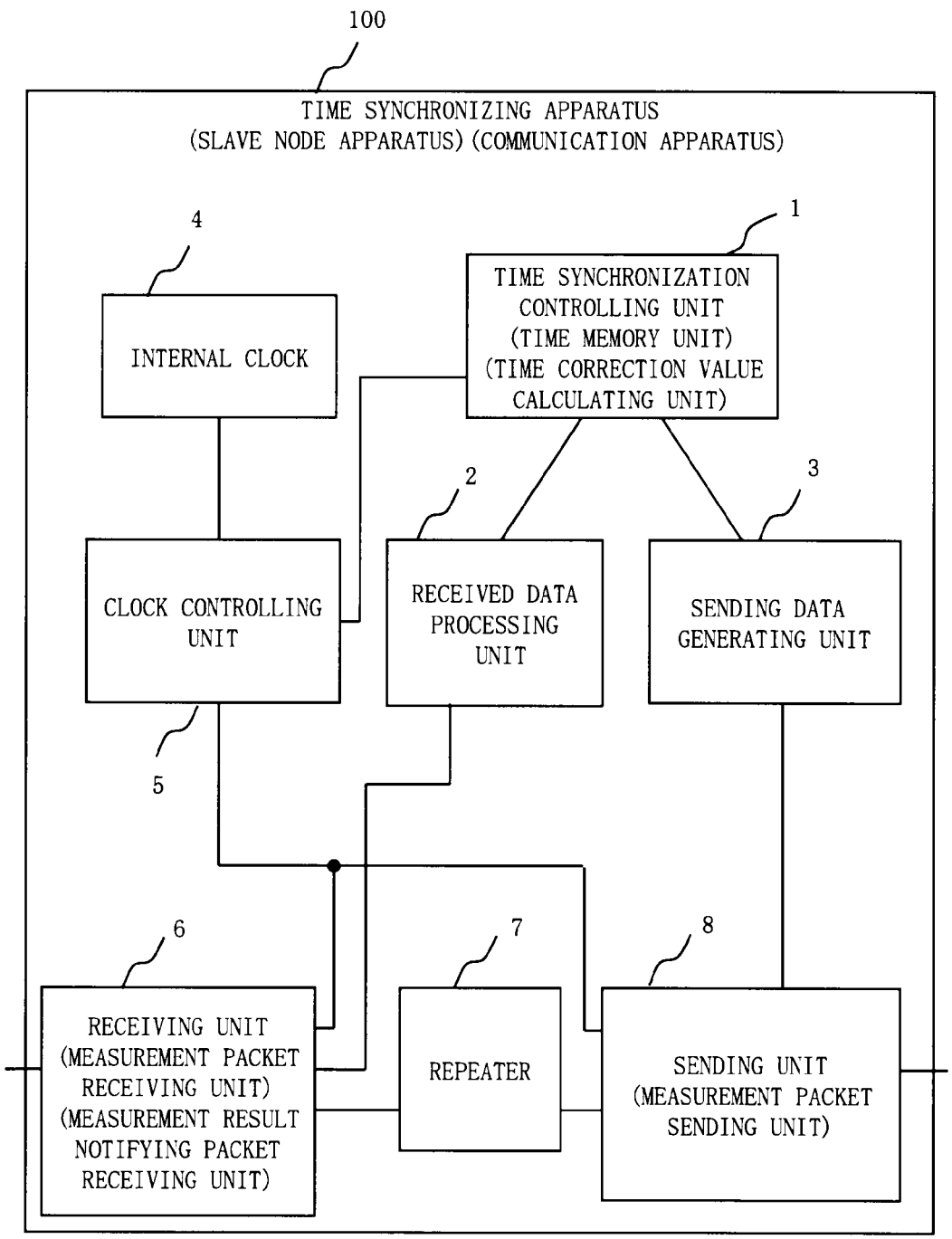
FIG. 2 shows a configuration example of a time synchronizing apparatus as a slave node according to the first embodiment.

FIGS. 1 and 2 show configuration examples of a time synchronizing apparatus 100 according to the present embodiment.

Figure 3:
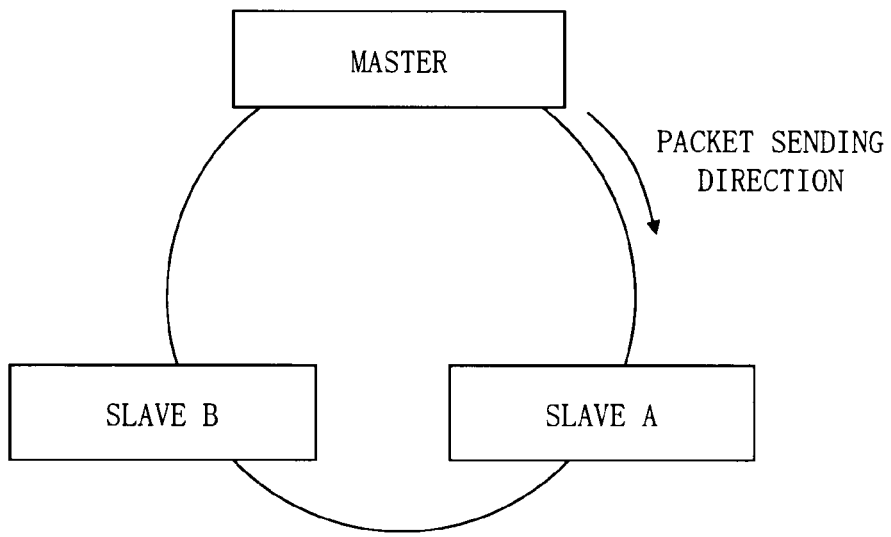
FIG. 3 shows a configuration example of a ring type network according to the first embodiment.

In the present embodiment, plural time synchronizing apparatuses 100 are connected as shown in FIG. 3 to form a ring type network.

Namely, a communication system discussed in the present embodiment is the ring type network in which a master node apparatus being a management apparatus and plural slave node apparatuses being communication apparatuses are connected as a ring as shown in FIG. 3. The master node apparatus and the slave node apparatuses are the time synchronizing apparatuses 100, respectively.

Packets are always sent by each node apparatus in a fixed direction as shown in FIG. 3. This limitation occurs not only by limitation on hardware but also occurs when time synchronization is controlled in an upper layer having no means to control the sending direction.

Further, as understood clearly by FIG. 3, for each node apparatus, a packet transferring order is defined. In the example of FIG. 3, a packet is transferred according to the packet transferring order as a master node apparatus—a slave node apparatus A—a slave node apparatus B—the master node apparatus; the packet is circulated among plural node apparatuses. A ring type network shown in FIG. 3 is also referred to as a circulation route.

FIG. 1 shows a configuration example of the time synchronizing apparatus 100 as the master node apparatus, and FIG. 2 shows a configuration example of the time synchronizing apparatus 100 as the slave node apparatus.

Either when operated as the master node apparatus or when as the slave node apparatus, the configuration itself of the time synchronizing apparatus 100 is the same; however, tasks of each configurational element and processing contents are different respectively when operated as the master node apparatus and operated as the slave node apparatus, so that two cases are shown as different drawings for convenience of the explanation.

However, either when operated as the master node apparatus or when as the slave node apparatus, the configuration itself of the time synchronizing apparatus 100 is the same, so that the same time synchronizing apparatus 100 can be either the master node apparatus or the slave node apparatus.

Hereinafter, for each configurational element, after explaining tasks and processing contents which are common to the master node apparatus and the slave node apparatus, tasks and processing contents which are specific to the master node apparatus and tasks and processing contents which are specific to the slave node apparatus will be explained.

Here, in the following, the master node apparatus is called simply as "a master" or "a master node", and the slave node apparatus is called simply as "a slave" or "a slave node".

In FIGS. 1 and 2, a time synchronization controlling unit 1 is means to control time synchronizing procedure, and is a circuit such as, for example, a CPU (Central Processing Unit), etc.

A received data processing unit 2 is means to carry out a processing for received data from a transmission channel, and is a circuit such as, for example, a CPU or an ASIC (Application Specific Integrated Circuit), etc.

A sending data generating unit 3 is means to generate sending data to be sent from the transmission channel, and is a circuit such as, for example, CPU or ASIC, etc.

An internal clock 4 is a circuit including means to measure time passage such as an internal oscillator, etc.

A clock controlling unit 5 is connected to the internal clock 4, a receiving unit 6, and a sending unit 8, respectively, is means to control time stamp obtainment of data transmission/receipt, and is a circuit such as ASIC, etc.

A receiving unit 6 is means to receive data from the transmission channel.

A repeater 7 is means to buffer the data received from the transmission channel to send at a high speed.

A sending unit 8 is means to send to the transmission channel.

In the present embodiment, the master node, as will be discussed later in detail, sends a measurement packet to the slave node which acts as its receiver according to the packet transferring order, receives the measurement packet which has been circulated among plural slave nodes, and according to time-keeping of the internal clock (reference clock), stores the sending time of the measurement packet and the received time of the measurement packet.

Further, the master node generates a measurement result notifying packet showing the sending time of the measurement packet and the received time of the measurement packet, and sends the measurement result notifying packet generated to the slave node which acts as its receiver according to the packet transferring order.

When operated as the master node performing the above processing, the configurational elements of the time synchronizing apparatus 100 mainly have the following tasks as shown in FIG. 1.

The internal clock 4 functions as a reference clock which is a reference of time synchronization among plural node apparatuses included in the ring type network.

Further, the sending unit 8 sends the measurement packet or the measurement result notifying packet to the slave node (communication apparatus) which acts as its receiver according to the packet transferring order. The sending unit 8 is an example of a measurement packet sending unit and a measurement result notifying packet sending unit.

The receiving unit 6 receives the measurement packet and the measurement result notifying packet which have been circulated among the plural slave nodes. The receiving unit 6 is an example of a measurement packet receiving unit.

The time synchronization controlling unit 1, according to the timekeeping of the internal clock 4, stores the sending time of the measurement packet by the sending unit 8 and the received time of the measurement packet by the receiving unit 6. The time synchronization controlling unit 1 is an example of a time memory unit.

The sending data generating unit 3 generates a measurement result notifying packet showing the sending time of the measurement packet and the received time of the measurement packet stored in the time synchronization controlling unit 1. The sending data generating unit 3 is an example of a measurement result notifying packet generating unit.

Further, in the present embodiment, as will be discussed later in detail, each slave node receives the measurement packet from a node apparatus, which acts as its sender according to the packet transferring order, sends the received measurement packet to a node apparatus which acts as its receiver according to the packet transferring order, and according to timekeeping of the internal clock, stores at least either of a sending time of the measurement packet and a received time of the measurement packet.

Further, each slave node receives the measurement result notifying packet from the node apparatus which acts as its sender according to the packet transferring order, calculates a time correction value using the sending time of the measurement packet and the received time of the measurement packet shown in the received measurement result notifying packet, at least either of the received time of the measurement packet stored and the sending time of the measurement packet stored, a total number of the node apparatuses, and a difference between an order of the slave node and an order of the master node according to the packet transferring order, and corrects a time of the internal clock using the calculated time correction value.

When operated as the slave node performing the above processing, the configurational elements of the time synchronizing apparatus 100 mainly have the following tasks as shown in FIG. 2.

The receiving unit 6 receives the measurement packet and the measurement result notifying packet transmitted by the master node (management apparatus) from the node apparatus which acts as its sender according to the packet transferring order. The receiving unit 6 is an example of a measurement packet receiving unit and a measurement result notifying packet receiving unit.

The sending unit 8 sends the measurement packet received by the receiving unit 6 to the node apparatus which acts as its receiver according to the packet transferring order. The sending unit 8 is an example of a measurement packet sending unit.

The time synchronization controlling unit 1, according to the timekeeping of the internal clock 4, stores at least either of the received time of the measurement packet by the receiving unit 6 and the sending time of the measurement packet by the sending unit 8.

The time synchronization controlling unit 1 calculates the time correction value using the sending time of the measurement packet and the received time of the measurement packet at the master node shown in the measurement result notifying packet, at least either of the received time of the measurement packet and the sending time of the measurement packet at that slave node stored, the total number of the node apparatuses included in the circulation route, and the difference between the order of that slave node and the order of the master node according to the packet transferring order. The time synchronization controlling unit 1 is an example of a time memory unit and a time correction value calculating unit.

The clock controlling unit 5 corrects the time of the internal clock 4 using the time correction value calculated by the time synchronization controlling unit 1.

Next, the operation will be explained.

Figure 4:
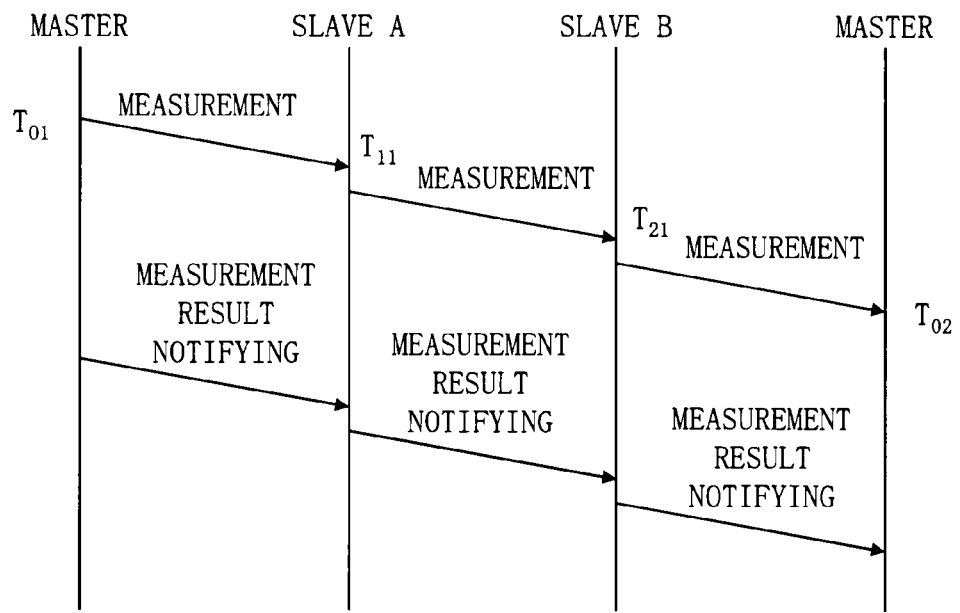
FIG. 4 shows an example of packet transmission between nodes according to the first embodiment.

In order to time sequentially show the packet exchange among the master, the slave A, and the slave B in FIG. 3, FIG. 4 is a time sequence diagram showing the ring structure broken at the master to spread in the horizontal direction, in which the vertical direction shows a time sequence.

Accordingly, "master" shown at the right and left ends in FIG. 4 are the same node.

The process of time synchronization is carried out at a fixed time interval, for example, by a timer of the master.

When the process of time synchronization starts, the master first sends a measurement packet, obtains and stores its sending time $T_{01}$.

The slave, on receiving the measurement packet, sends the packet after repeating to the next node via a repeater at a high speed, and reads the data as well. At this time, the slave obtains and stores the received time or the sending time. Hereinafter, an example will be explained, in which the slave obtains and stores the received time of the measurement packet.

In FIG. 4, a packet received time $T_{11}$ is obtained at the slave A and a packet received time $T_{21}$ is obtained at the slave B.

Next, on receiving the measurement packet which has been circulated round the ring, the master obtains a received time $T_{02}$.

Next, the master stores the values of $T_{01}$ and $T_{02}$ obtained at the own node in the measurement result notifying packet, sends the measurement result notifying packet, and notifies each slave.

Each slave calculates a correction value applied to the time shown by each internal clock, from the values of $T_{01}$ and $T_{02}$ received with the measurement result notifying packet and the sending time and the received time obtained by the own node.

Up to the above, the sending time and the received time obtained by each node of the master, the slave A, and the slave B are values obtained by each internal clock, and each internal clock has a difference with the absolute time and each time shown by each internal clock is different with each other because of the influence of the precision of its internal oscillator, etc.

Here, an offset of the internal clock of each slave derived from the internal clock of the master (reference clock), namely, the correction value of the internal clock at each slave is calculated.

Here, the time correction value is calculated, assuming that the delay time at the time of sending/receiving the measurement packet is the same among respective nodes.

Accordingly, each inter-node delay time in FIG. 4 is a time obtained by dividing the delay time of one cycle of the ring ($T_{02}-T_{01}$) with the number of nodes.

Further, the delay of the received time at each node from the sending time $T_{01}$ of the master is a value obtained by multiplying the number of slave nodes existing on the route from the master to the slave including the own node (a difference of orders according to the packet transferring order between the master node and the slave node) to the above value.

In FIG. 4, a correction value ΔT1 of the internal clock of the slave A is:

$$\Delta T1 = T_{01} + (T_{02}-T_{01})/3 - T_{11}$$

Further, a correction value ΔT2 of the internal clock of the slave B is:

$$\Delta T2 = T_{01} + (T_{02}-T_{01})\} \times 2/3 - T_{21}.$$

After obtaining these correction values at each slave, the time of the internal clock is adjusted using the calculated correction value at an arbitrary timing, thereby the time synchronization process is completed.

Next, a detail of the process of the time synchronizing apparatus 100 operated as the master and a detail of the process of the time synchronizing apparatus 100 operated as the slave will be discussed.

First, the process of the time synchronizing apparatus 100 operated as the master is shown.

Figure 5:
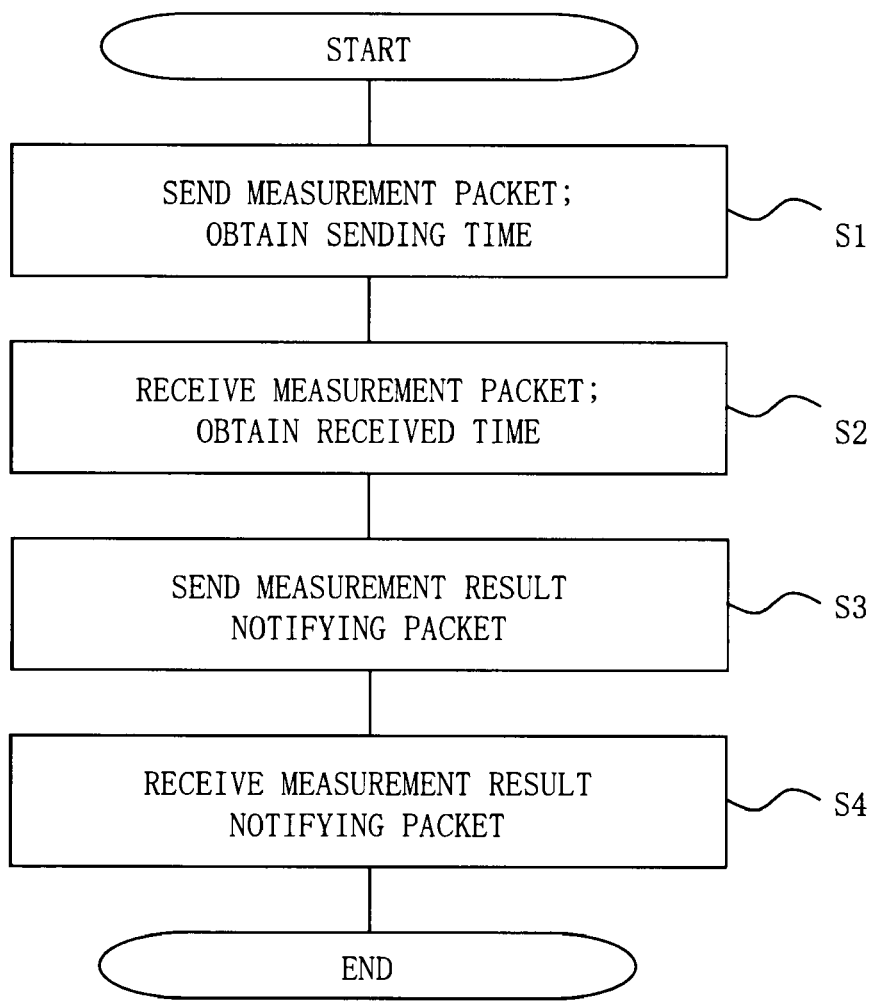
FIG. 5 is a flowchart showing an operation example of the master node according to the first embodiment.

FIG. 5 is a processing flow of the time synchronizing apparatus 100 operated as the master.

The master starts these series of time synchronization process with triggers of periodic operation by the timer inside of the master, the operation by the operator, various event that occur by software and hardware inside of the master, and so on.

On starting the time synchronization process, the master first sends the measurement packet and obtains the sending time (S1).

Figure 6:
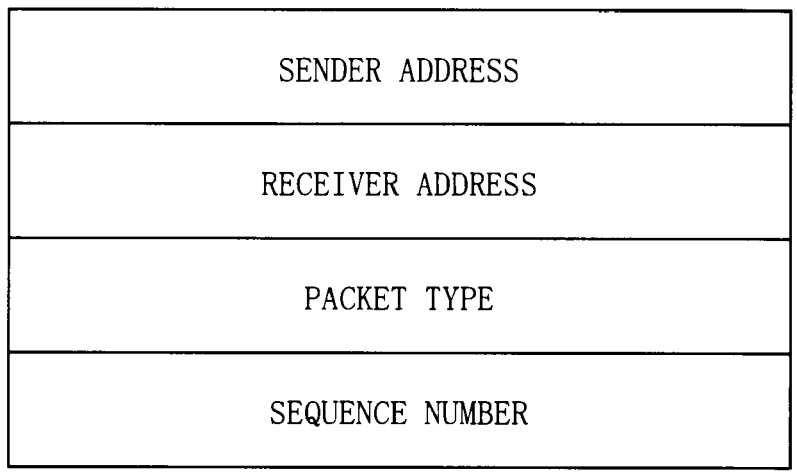
FIG. 6 shows an example of a measurement packet according to the first embodiment.

An example of a format of the measurement packet is shown in FIG. 6.

In FIG. 6, a sender address and a receiver address are addresses to identify each node in the ring type network.

In the measurement packet, since the receiver is all nodes, a broadcast address is specified as the receiver address.

For the broadcast address, for example, when the address length is one byte, FF in hexadecimal number, etc. is previously reserved.

A packet type shows a type of packet according to its value.

In this embodiment, values are reserved for two types: the measurement packet and the measurement result notifying packet.

A sequence number is used for relating a series of packets.

In FIG. 4, by storing the same numbers in the sequence number field of a series of the measurement packet and the measurement result notifying packet, the series of packets are related with each other by the receiver side.

The sequence number can be assigned freely as long as the series of packets can be identified; for example, a counter is incremented at every sending of the measurement packet by the master, and the same value is stored in the related measurement result notifying packet.

As for the internal process of the master at the time of sending the measurement packet, first, the time synchronization controlling unit 1 issues a command to send the measurement packet to the sending data generating unit 3.

The sending data generating unit 3, on receiving the command, generates the measurement packet and sends to the sending unit 8.

The sending unit 8 sends out the measurement packet to the transmission channel, and sends a timing signal to the clock controlling unit 5 at a timing of sending.

The clock controlling unit 5, on receiving the timing signal, obtains a time shown by the internal clock 4.

On the other hand, when the sending process is completed by the sending unit 8, and the control returns to the time synchronization controlling unit 1 through the sending data generating unit 3, the time synchronization controlling unit 1 obtains the time which has been obtained at the timing of sending the measurement packet by the sending unit 8 from the clock controlling unit 5, and stores the time as the sending time of the measurement packet by relating the time to the sequence number.

After sending the measurement packet, next, the master receives the same measurement packet which has been circulated round the ring.

At this time, the received time is obtained and stored as the received time of the measurement packet (S2).

As for the process inside of the master, first, the receiving unit 6 receives the measurement packet.

At this time, by a timing signal from the receiving unit 6, the clock controlling unit 5 obtains the time of the internal clock 4.

Simultaneously, the data of the measurement packet received by the receiving unit 6 is transmitted to the received data processing unit 2, the type of packet is determined by the received data processing unit 2, and an event of receiving the measurement packet is notified to the time synchronization controlling unit 1.

The time synchronization controlling unit 1, on receiving the event of receiving the measurement packet, obtains the time, which has been obtained at the timing of receiving the packet by the receiving unit 6, from the clock controlling unit, relates the time to the sequence number as the received time of the measurement packet, and stores the time.

Next, the master sends the measurement result notifying packet, and notifies the sending time of the measurement packet and the received time of the measurement packet measured by the own node to each slave (S3).

As for the internal process of the master, the time synchronization controlling unit 1 notifies the sending time of the measurement packet and the received time of the measurement packet stored inside to the sending data generating unit 3 with a command to send the measurement result notifying packet.

The sending data generating unit 3 generates the measurement result notifying packet in which the sending time of the measurement packet and the received time of the measurement packet are stored in the fields of the master sending time and the master received time of the measurement result notifying packet.

Figure 7:
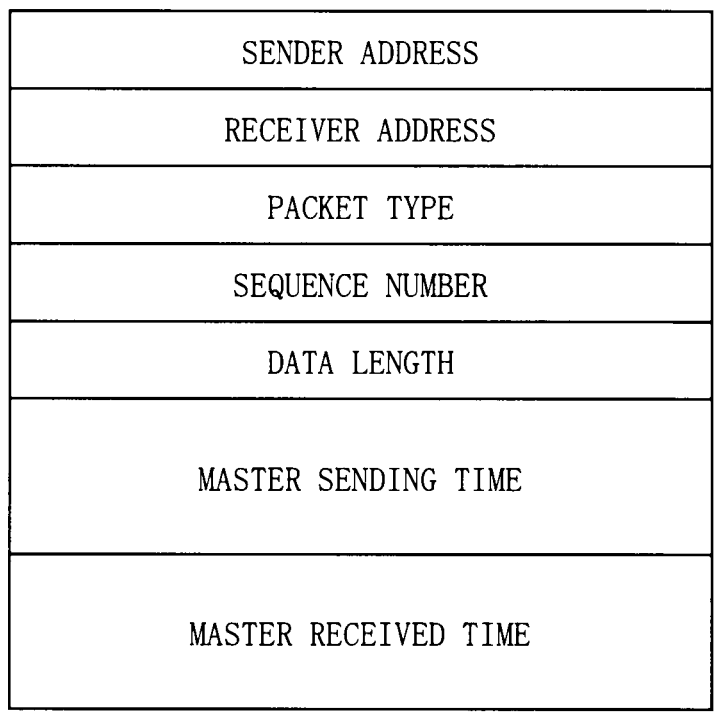
FIG. 7 shows an example of a measurement result notifying packet according to the first embodiment.

An example of a format of the measurement result notifying packet is shown in FIG. 7.

The packet generated by the sending data generating unit 3 is sent from the sending unit 8 to the transmission channel.

Next, the master receives the measurement result notifying packet which has been circulated round the ring (S4).

As for the internal process of the master, the receiving unit 6 receives the packet, the type of packet is determined by the received data processing unit 2, and an event of receiving the measurement result notifying packet is notified to the time synchronization controlling unit 1.

Next, the process at the slave will be shown.

Figure 8:
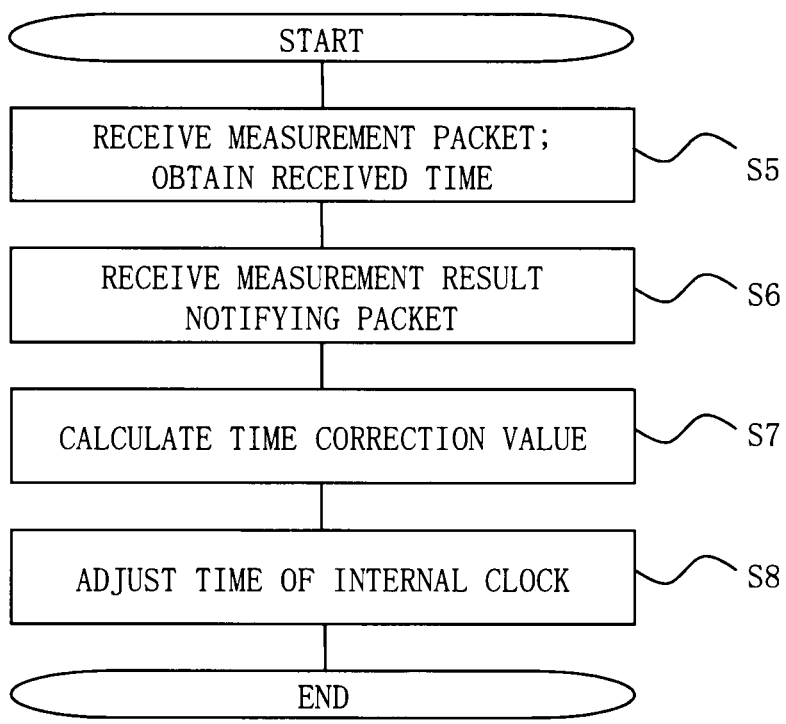
FIG. 8 is a flowchart showing an operation example of the slave node according to the first embodiment.

FIG. 8 is an example of processing flow at the slave.

First, the slave receives the measurement packet, sends the measurement packet to the next node, and as well obtains the sending time (S5).

The following processing is done inside of the slave.

First, the receiving unit 6 receives the measurement packet.

At this time, the receiving unit 6 sends a timing signal of receiving the packet to the clock controlling unit 5.

The clock controlling unit 5 which has received the timing signal obtains and stores the time shown by the internal clock 4.

Further, the received packet is transmitted to the repeater 7 from the receiving unit 6, and as well imported to the received data processing unit 2.

The packet sent to the repeater 7 is buffered, and sent to the sending unit 8 as it is without changing, or sent to the sending unit 8 with changing a header and a trailer of the data link layer.

The sending unit 8 sends out the packet received from the repeater 7 to the transmission channel.

On the other hand, the received data processing unit 2 which has imported the data of the measurement packet from the receiving unit 6 identifies the type of packet and notifies an event of receiving the measurement packet to the time synchronization controlling unit 1.

The time synchronization controlling unit 1, which has received the event, obtains the time, which has been obtained by the receiving unit 6 at the timing of receiving the measurement packet, from the time controlling unit 5 and stores the time by relating to the sequence number of the measurement packet.

Next, the slave receives the measurement result notifying packet (S6).

The following operation is done inside of the slave.

First, the receiving unit 6 receives the measurement result notifying packet.

The received packet is transmitted to the repeater 7 from the receiving unit 6, and as well imported to the received data processing unit 2.

The packet sent to the repeater 7 is buffered, and sent to the sending unit 8 as it is without changing, or sent to the sending unit 8 with changing the header and the trailer to the data link layer.

The sending unit 8 sends out the packet received from the repeater 7 to the transmission channel.

Further, on the other hand, the received data processing unit 2 which has imported the data of the measurement result notifying packet from the receiving unit 6 identifies the type of packet and notifies an event of receiving the measurement result notifying packet to the time synchronization controlling unit 1.

Next, the slave calculates a correction value of the time of the internal clock of the own node (S7).

Inside of the slave, the time synchronization controlling unit 1, which has received the event of receiving the measurement result notifying packet, extracts the sending time of the measurement packet and the received time of measurement packet measured at the master from the data of the measurement result notifying packet obtained on the event notification, and calculates a correction value of the time by combining with the received time of the measurement packet measured at the slave.

At this time, each received time data and each sending time data are related with each other using the sequence number of each packet.

The calculation expression of the correction value of the time has been shown in case of FIG. 4; the following shows a more generalized form.

Now, if it is assumed that the sending time of the measurement packet measured at the master is $T_{MS}$, the received time of the measurement packet is $T_{MR}$, the received time of the measurement packet measured at the slave is $T_{SR}$, the number of nodes within the ring is n, and that slave is the m-th node counted from the master, the correction value $\Delta T$ of the time at the slave is $$\Delta T = T_{MS} + (T_{MR} - T_{MS}) \times m/n - T_{SR}.$$

Here, the received time of the measurement packet at the slave $T_{SR}$ is stored and used for calculating the time correction value; however, instead, it is also possible to store the sending time of the measurement packet at the slave and use for calculating the time correction value as discussed above.

Next, the slave adjusts the time of the internal clock using the calculated time correction value (S8).

In the internal process of the slave, the time synchronization controlling unit 1 issues a command to adjust the internal clock to the clock controlling unit 5 using the correction value $\Delta T$ calculated at S7.

On receiving the command to adjust the internal clock, the clock controlling unit 5 carries out a process to add the correction value $\Delta T$ to the current time of the internal clock 4. Up to the above process, the time synchronizing process to synchronize the internal clock of the slave to the internal clock (reference clock) of the master is completed.

In the above example, it is possible to set the number of nodes "n" within the ring and the number of nodes "m" existing on the route from the master to the slave as parameters in each slave as "n" and "m" are predetermined at the time of forming the ring type network; however, it is also possible to automatically count the numbers as will be discussed in the following.

Figure 9:
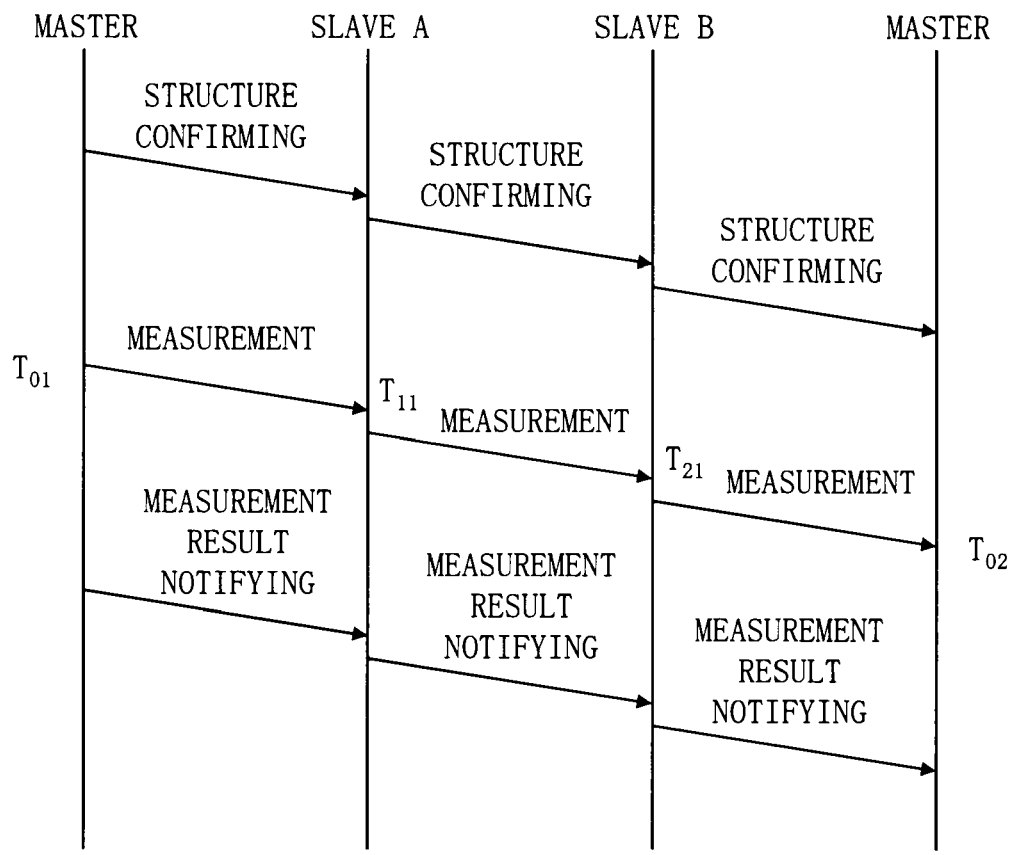
FIG. 9 shows an example of packet transmission between nodes according to the first embodiment.

FIG. 9 shows an example of packet exchanging procedure in such a case.

As shown in FIG. 9, a structure confirming packet is circulated round among the node apparatuses in the ring type network, and values of the above "n" and "m" are obtained.

It is not necessary to implement this procedure at each time synchronization, but it is sufficient to implement only when the structure of the network is changed.

Figure 10:
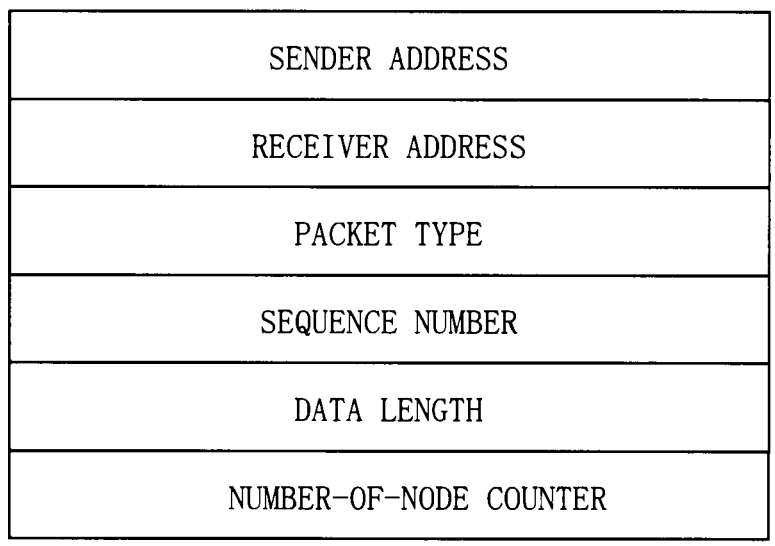
FIG. 10 shows an example of a structure confirming packet according to the first embodiment.

FIG. 10 is an example of a format of the structure confirming packet.

A field of a number-of-node counter is to count the number of nodes within the ring type network; the counter stores 1 at the time of sending from the master, and at each slave, the counter is incremented by 1 on receiving the structure confirming packet and sending to the next node.

In this way, the value stored in the number-of-node counter when each slave receives the structure confirming packet is the value of "m" at that slave; and the value stored in the number-of-node counter when the master receives the structure confirming packet which has been circulated round the ring and returned is the total number of nodes "n" within the ring.

In order to notify the value of "n" from the master to each slave, an exclusive packet for such notification can be sent from the master; alternatively, the value of "n" is stored at the master side, and at the time of time synchronization, the value is stored in the measurement packet or the measurement result notifying packet and can be sent to the slave.

As has been discussed, the time correction value is calculated by estimating delay from sending at the master to receiving at the slave based on the delay time of one cycle of the ring which is actually measured in circulating the measurement packet round the ring type network, so that the time synchronization with a high precision can be implemented.

Further, since only the packets sent in the same direction are used, it is applicable to the ring type network which has a function to send in only one direction, and time synchronization control from the upper layer being unable to select the sending direction.

Further, since the measurement packet is, at the slave, transferred to the next node by high-speed transmission via the repeater, the time required for circulating the measurement packet round the ring can be shortened, which enables to implement the time synchronization quickly. At the same time, the precision of calculating the delay time can be improved, which improves the precision of the time synchronization.

Further, the time synchronization process at the slave is uniformed, which simplifies the operation.

As discussed, in the present embodiment, the time synchronization apparatus including the following means has been explained:
(a) receiving means and sending means for the first transmission channel;
(b) the internal clock;
(c) means to obtain and store times based on the internal clock at timing of receiving the packet and the sending the packet by the receiving means and the sending means; and
(d) controlling means to exchange the above time information with another node, calculate the time correction value, and adjust the time of the internal clock.

Further, in the present embodiment, the master node apparatus including the following means has been explained:
(a) means to send the measurement packet and obtain the sending time;
(b) means to receive the measurement packet and obtain the received time; and
(c) means to store the sending time and the received time in the measurement result notifying packet and send the measurement result notifying packet.

Further, in the present embodiment, the slave node apparatus including the following means has been explained:
(a) means to receive the measurement packet and obtain the received time;
(b) means to receive the measurement result notifying packet and extract the master sending time and the master received time;
(c) means to calculate the time correction value using the master sending time, the master received time, the slave received time, the number of nodes in the ring, and the number of nodes existing on the route from the master to the slave; and
(d) means to adjust the time of the internal clock using the calculated time correction value.

Embodiment 2

In the foregoing first embodiment, the time correction value is calculated from the measured values including relay processing time at the slave. Next, another time synchronizing method will be discussed, in which each slave measures the received time and the sending time and the time correction value is calculated by the measured values without including the relay processing time at the slave.

Figure 13:
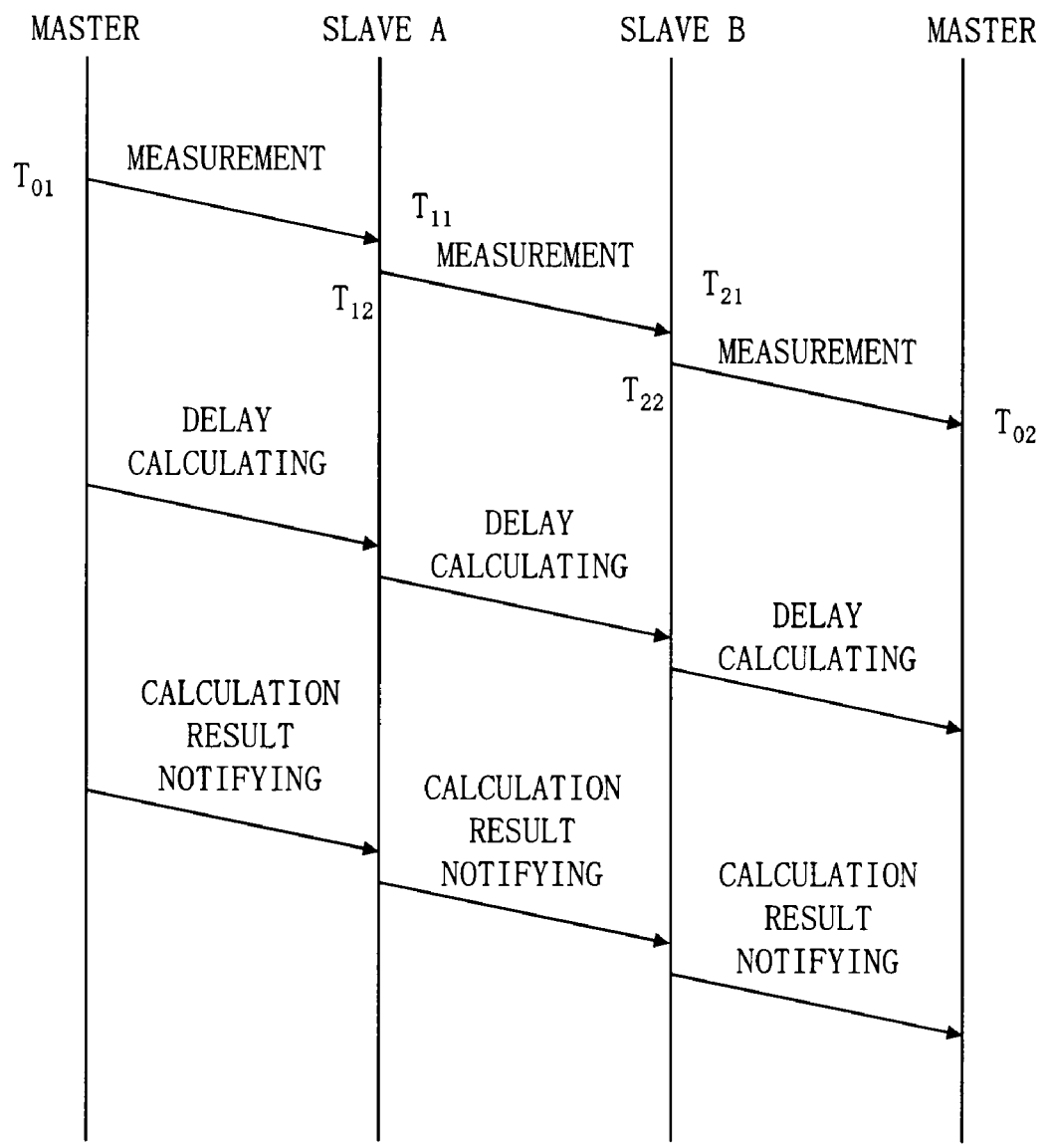
FIG. 13 shows an example of packet transmission between nodes according to the second embodiment.

FIG. 13 shows a packet exchanging procedure in such a case.

In the present embodiment, the master and the slave respectively obtain the received time and the sending time of the measurement packet. A sum of the relay processing time in all slaves, namely, a sum of difference between the received time and the sending time of the measurement packet at each slave is subtracted from the actual measured value of the delay time when the packet goes round the ring to obtain a sum of respective inter-node transmission delays, this sum is divided by the number of nodes in the ring to obtain an average value, and the time correction value in each node is calculated using the average value as the transmission delay.

Figure 11:
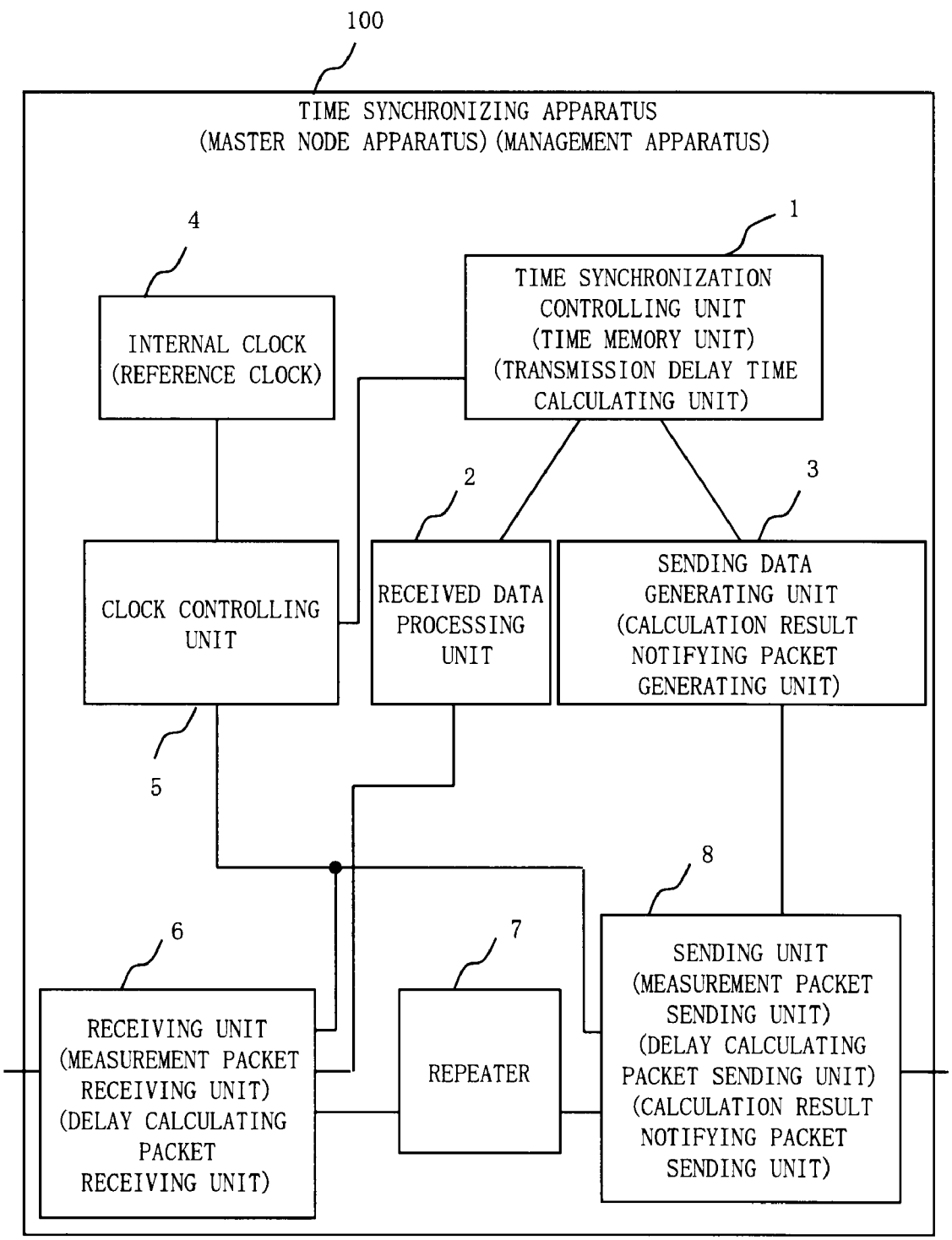
FIG. 11 shows a configuration example of a time synchronizing apparatus as a master node according to the second embodiment.
Figure 12:
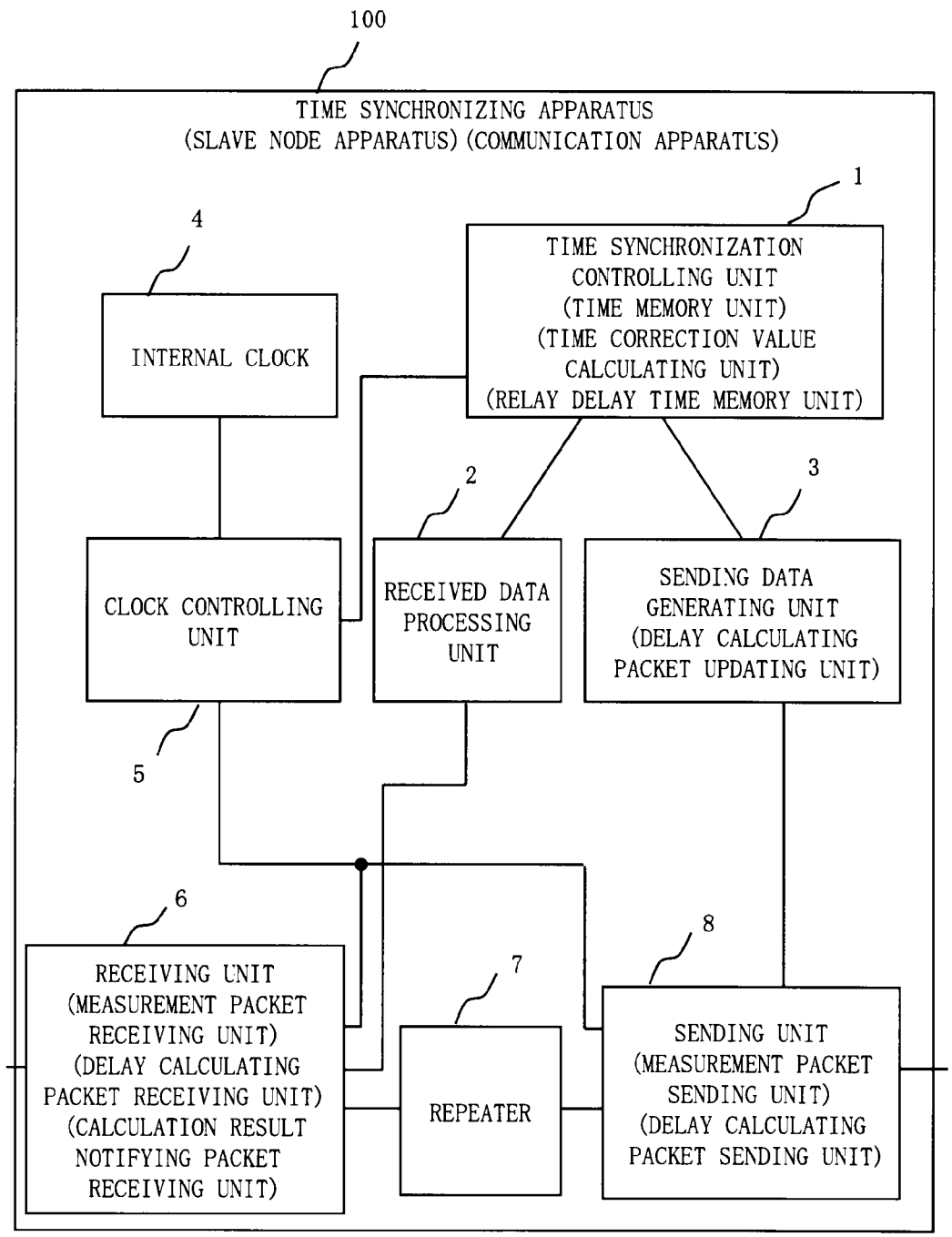
FIG. 12 a configuration example of a time synchronizing apparatus as a slave node according to the second embodiment.

FIGS. 11 and 12 show configuration examples of a time synchronization apparatus 100 according to the present embodiment.

The configurations shown in FIGS. 11 and 12 are the same as the ones of FIGS. 1 and 2 shown in the first embodiment; however, tasks and processing contents of some configurational elements are different, so that each configurational element related to the second embodiment will be explained with reference to FIGS. 11 and 12.

FIG. 11 shows a configuration example of the time synchronizing apparatus 100 as the master node apparatus, and FIG. 12 shows a configuration example of the time synchronizing apparatus 100 as the slave node apparatus.

As explained in the first embodiment, either when operated as the master node apparatus or when as the slave node apparatus, the configuration itself of the time synchronizing apparatus 100 is the same; however, tasks of each configurational element and processing contents are different respectively when operated as the master node apparatus and operated as the slave node apparatus, so that two cases are shown as different drawings for convenience of the explanation.

However, either when operated as the master node apparatus or when as the slave node apparatus, the configuration itself of the time synchronizing apparatus 100 is the same, so that the same time synchronizing apparatus 100 can be either the master node apparatus or the slave node apparatus.

In the present embodiment, the master node, as will be discussed later in detail, sends the measurement packet to the slave node which acts as its receiver according to the packet transferring order, receives the measurement packet which has been circulated among plural slave nodes, and according to the time-keeping of the reference clock, stores the sending time of the measurement packet and the received time of the measurement packet.

Further, the master node sends a delay calculating packet for obtaining a total sum of relay delay time at plural slave nodes to a slave node which acts as its receiver according to the packet transferring order, and receives the delay calculating packet which has been circulated among the plural slave nodes. The delay calculating packet is circulated among the plural slave nodes included in the circulation route, the relay delay time at each slave node is accumulated, and the total sum of the relay delay time of the plural slave nodes is shown.

Further, the master node calculates an inter-node apparatus transmission delay time based on the total sum of the relay delay time of the plural slave nodes shown in the delay calculating packet received, the sending time of the measurement packet and the received time of the measurement packet stored, and the total number of the node apparatuses, generates a calculation result notifying packet showing the sending time of the measurement packet stored and the calculated inter-node apparatus transmission delay time, and sends the generated calculation result notifying packet to the slave node which acts as its receiver according to the packet transferring order.

When operating as the master node performing the above processing, the configurational elements of the time synchronization controlling unit 100 include main tasks like the following as shown in FIG. 11.

The internal clock 4, similarly to the first embodiment, functions as the reference clock which is a reference of time synchronization among the plural node apparatuses included in the ring type network.

The sending unit 8 sends the measurement packet, the delay calculating packet, and the calculation result notifying packet to the slave node which acts as its receiver according to the packet transferring order. The sending unit 8 is an example of a measurement packet sending unit, a delay calculating packet sending unit, and a calculation result notifying packet sending unit.

The receiving unit 6 receives the measurement packet, the delay calculating packet, and the calculation result notifying packet which have been circulated among plural slave nodes. The receiving unit 6 is an example of a measurement packet receiving unit, and a delay calculating packet receiving unit.

The time synchronization controlling unit 1 stores, according to time-keeping of the reference clock, the sending time of the measurement packet by the sending unit 8 and the received time of the measurement packet by the receiving unit 6. Further, the time synchronization controlling unit 1 calculates the inter-node apparatus transmission delay time based on the total sum of the relay delay time at the plural slave nodes shown in the delay calculating packet received by the receiving unit 6, the sending time of the measurement packet stored and the received time of the measurement packet stored, and the total number of the node apparatuses included in the circulation route. The time synchronization controlling unit 1 is an example of a time memory unit and a transmission delay time calculating unit.

The sending data generating unit 3 generates the calculation result notifying packet showing the sending time of the measurement packet stored by the time synchronization controlling unit 1 and the inter-node apparatus transmission delay time calculated by the time synchronization controlling unit 1. The sending data generating unit 3 is an example of a calculation result notifying packet generating unit.

Further, in the present embodiment, as will be discussed later in detail, each slave node receives the measurement packet from the node apparatus which acts as its sender according to the packet transferring order, sends the received measurement packet to the node apparatus which acts as its receiver according to the packet transferring order, and according to the time-keeping of the internal clock, stores the received time of the measurement packet and the sending time of the measurement packet.

Further, each slave node receives the delay calculating packet from the node apparatus which acts as its sender according to the packet transferring order, obtains an accumulated value of the relay delay time of other preceding slave nodes according to the packet transferring order included in the delay calculating packet, and stores the obtained accumulated value of the relay delay time.

In addition, each slave node adds a time of a difference between the received time of the measurement packet and the sending time of the measurement packet stored to the accumulated value of the relay delay time included in the delay calculating packet to make a new accumulated value of the relay delay time, sends the delay calculating packet including the new accumulated value of the relay delay time to the node apparatus which acts as its receiver according to the packet transferring order, receives the calculation result notifying packet from the node apparatus which acts as its sender according to the packet transferring order, calculates a time correction value using the sending time of the measurement packet and the inter-node apparatus transmission delay time shown in the received calculation result notifying packet, either of the received time of the measurement packet stored and the sending time of the measurement packet stored, the accumulated value of the relay delay time stored, and a difference between the order of the slave node and the order of the master node according to the packet transferring order, and corrects the time of the internal clock using the calculated time correction value.

When operating as the slave node performing the above processing, the configurational elements of the time synchronizing apparatus 100 mainly have the following tasks as shown in FIG. 12.

The receiving unit 6 receives the measurement packet, the delay calculating packet, and the calculation result notifying packet transmitted by the master node from the node apparatus which acts as its sender according to the packet transferring order. The receiving unit 6 is an example of a measurement packet receiving unit, a delay calculating packet receiving unit, and a calculation result notifying packet receiving unit.

The sending unit 8 sends the measurement packet and the calculation result notifying packet received by the receiving unit 6 to the node apparatus which acts as its receiver according to the packet transferring order. Further, the sending unit 8 sends the delay calculating packet in which the new accumulated value of the relay delay time is stored by the sending data generating unit 3 to the node apparatus which acts as its receiver according to the packet transferring order. The sending unit 8 is an example of a measurement packet sending unit and a delay calculating packet sending unit.

The time synchronization controlling unit 1 stores, according to the time-keeping of the internal clock, the received time of the measurement packet by the receiving unit 6 and the sending time of the measurement packet by the sending unit 8. Further, the time synchronization controlling unit 1 obtains the accumulated value of the relay delay time included in the delay calculating packet received by the receiving unit 6, and stores the obtained accumulated value of the relay delay time. Further, the time synchronization controlling unit 1 adds the time of the difference between the received time of the measurement packet stored and the sending time of the measurement packet stored to the accumulated value of the relay delay time included in the delay calculating packet to make a new accumulated value of the relay delay time. In addition, the time synchronization controlling unit 1 calculates the time correction value using the sending time of the measurement packet and the inter-node apparatus transmission delay time shown in the received calculation result notifying packet, at least either of the received time of the measurement packet stored and the sending time of the measurement packet stored, the accumulated value of the relay delay time stored, the total number of the node apparatuses included in the circulation route, and the difference between the order of that slave node and the order of the master node according to the packet transferring order. The time synchronization controlling unit 1 is an example of a time memory unit, a relay delay time memory unit, and a time correction value calculating unit.

The sending data generating unit 3 stores the new accumulated value calculated by the time synchronization controlling unit 1 in the delay calculating packet. The sending data generating unit 3 is an example of a delay calculating packet updating unit.

The clock controlling unit 5 corrects the time of the internal clock 4 using the time correction value calculated by the time synchronization controlling unit 1.

Next, the operation of the master and the slave will be explained.

First, the operation of the master will be explained.

Figure 14:
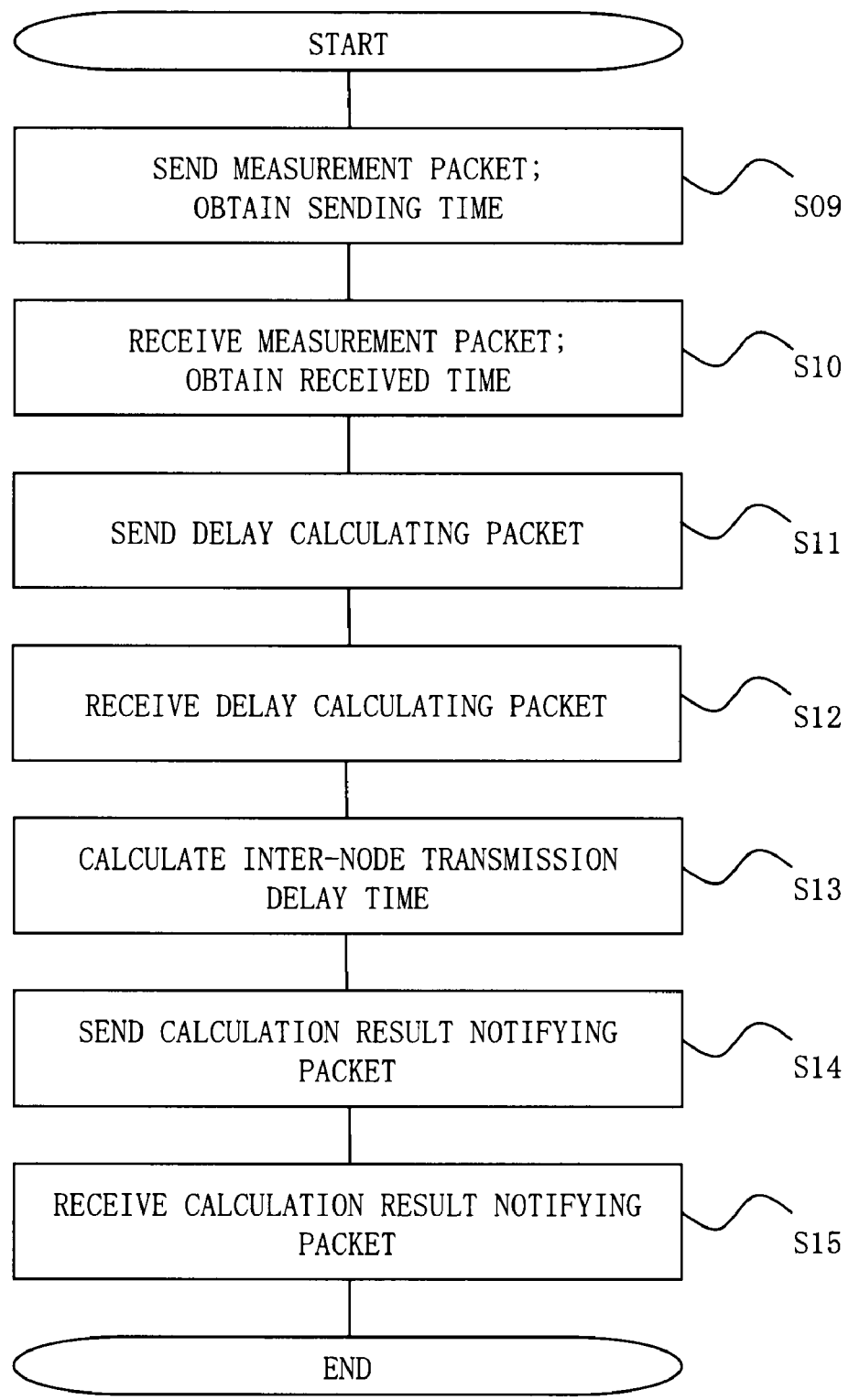
FIG. 14 is a flowchart showing an operation example of the master node according to the second embodiment.

FIG. 14 shows an example of the processing flow of the master.

First, the master sends the measurement packet and obtains the sending time (S9).

Next, the master receives the measurement packet which has been circulated round the ring and obtains the received time (S10).

The above processes are the same as explained in the first embodiment; inside of the master, the time synchronization controlling unit 1 stores the sending time and the received time of the measurement packet and the sequence number of the measurement packet.

Next, the master sends the delay calculating packet (S11).

The delay calculating packet is generated by the sending data generating unit 3 based on the instruction from the time synchronization controlling unit 1 and sent to the next slave by the sending unit 8.

Figure 15:
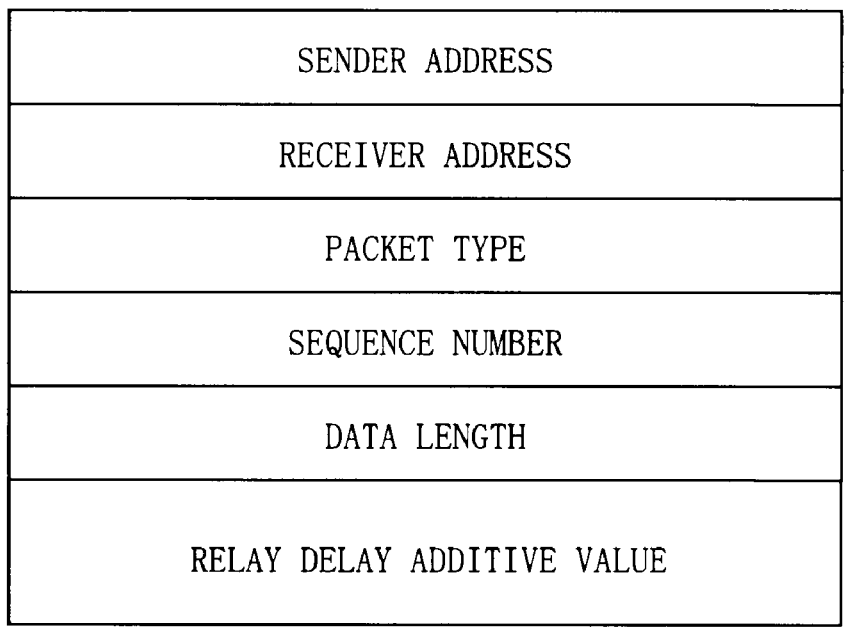
FIG. 15 shows an example of a delay calculating packet according to the second embodiment.

An example of a format of the delay calculating packet is shown in FIG. 15.

In FIG. 15, a relay delay additive value stores 0 at the time of sending from the master, and at each passing through the slave, the time of relay processing at each slave, namely, the difference between the sending time and the received time actually measured with the measurement packet is added.

The delay calculating packet is not sent by broadcast but sent to only the next node in order to implement a process to add the relay delay additive value at each slave.

Next, the master receives the delay calculating packet which has been circulated among all the slaves within the ring (S12).

At this time, the relay delay additive value of the delay calculating packet stores the total sum of the relay processing time of all the nodes.

Next, the master calculates the inter-node transmission delay time using the total sum of the relay processing time (S13).

Now, if it is assumed that the sending time of the measurement packet at the master is $T_{MS}$, the received time of the measurement packet is $T_{MR}$, the sum of the relay processing time is $T_S$, and the number of nodes within the ring is "n", an average value $T_D$ of the inter-node transmission delay time is $$T_D = (T_{MR} - T_{MS} - T_S)/n.$$

Inside of the master, the delay calculating packet received by the receiving unit 6 is inputted to the time synchronization controlling unit 1 through the received data processing unit 2, and the time synchronization controlling unit 1 calculates the inter-node apparatus transmission delay time using the above expression.

After calculating the inter-node transmission delay time, the master next stores the sending time of the measurement packet measured at the master and the inter-node transmission delay time calculated at S13 in the calculation result notifying packet and sends the packet (S14).

Inside of the master, the time synchronization controlling unit 1 notifies the sending time of the measurement packet stored and the transmission delay time calculated to the sending data generating unit 3, and the calculation result notifying packet is generated by the sending data.

Figure 16:
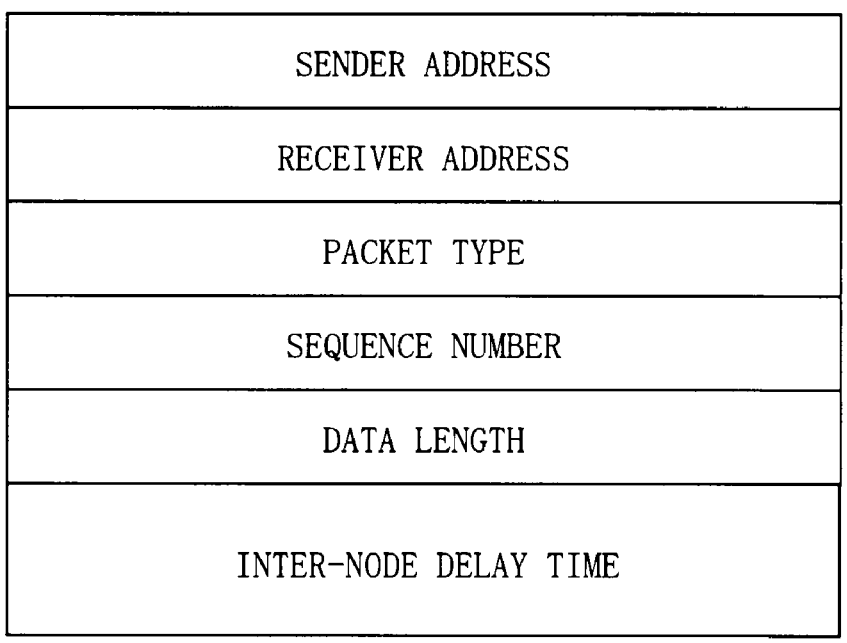
FIG. 16 shows an example of a calculation result notifying packet according to the second embodiment.

An example of a format of the calculation result notifying packet is shown in FIG. 16.

Next, the master receives the calculation result notifying packet (S15) and the process terminates.

Next, the operation of the slave will be explained.

Figure 17:
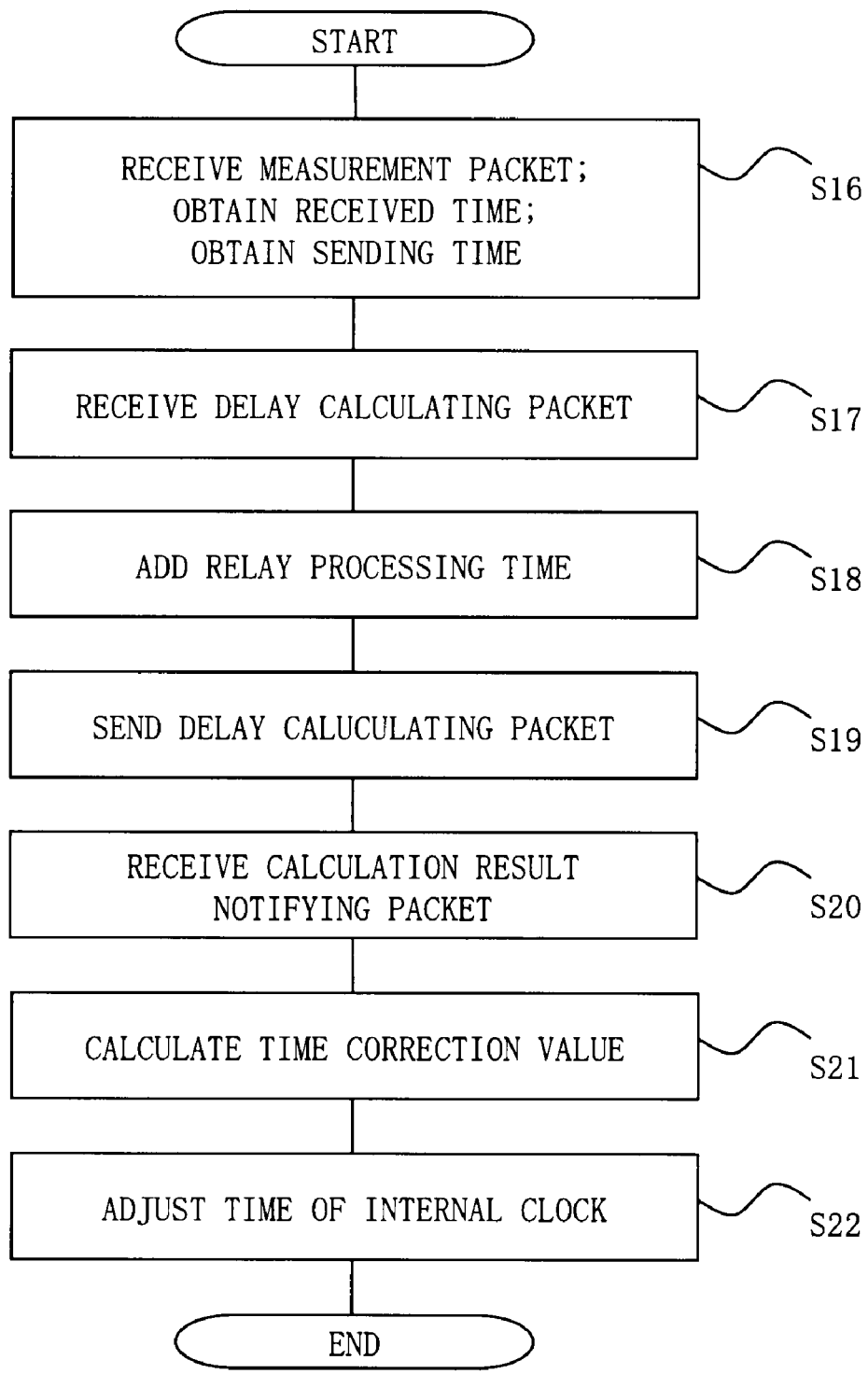
FIG. 17 is a flowchart showing an operation example of the slave node according to the second embodiment.

FIG. 17 shows an example of the processing flow of the slave.

First, the slave receives the measurement packet (S16). The received measurement packet is sent after repeating to the next node via the repeater inside of the slave. At this time, the received time and the sending time are obtained and stored, respectively.

This process is the same as the first embodiment; inside of the slave, the time synchronization controlling unit 1 stores the received time of the measurement packet and the sequence number of the measurement packet.

Next, the slave receives the delay calculating packet (S17).

At this time, the slave extracts the value stored in the relay delay additive value of the received delay calculating packet and stores the value.

Inside of the slave, the delay calculating packet received by the receiving unit 6 is inputted to the time synchronization controlling unit 1 through the received data processing unit 2, and the time synchronization controlling unit 1 extracts the value of the relay delay time of the delay calculating packet and stores the value.

Next, the slave carries out an addition of the relay processing time (S18).

The slave adds a value obtained by subtracting the received time of the measurement packet from the sending time of the measurement packet obtained at the own node to the value stored in the field of the relay delay additive value of the delay calculating packet received at S17. Namely, if it is assumed that the received time of the measurement packet obtained at the slave is $T_{SR}$, and the sending time of the measurement packet is $T_{SS}$, the value to be added to the relay delay additive value is $T_{SS}-T_{SR}$.

That is, the time synchronization controlling unit 1 adds the time of the difference between the received time of the measurement packet and the sending time of the measurement packet stored to the relay delay additive value (the accumulated value of the relay delay time) included in the delay calculating packet to calculate a new relay delay additive value (a new accumulated value of the relay delay time).

Next, the slave newly stores the value added at S18 in the relay delay additive value field of the delay calculating packet to be sent to the next node and sends the delay calculating packet (S19).

Inside of the slave, the sending data generating unit 3 stores the new relay delay additive value calculated by the time synchronization controlling unit 1 in the delay calculating packet, and the sending unit 8 sends the delay calculating packet showing the updated relay delay additive value to the next slave.

Next, the slave receives the calculation result notifying packet (S20).

On receiving the calculation result notifying packet, the slave next calculates the time correction value of the own node (S21).

If it is assumed the received time of the measurement packet measured by the slave at S16 is $T_{SR}$, the relay delay additive value of the delay calculating packet received by the slave at S17 is $T_{SD}$, the value stored in the master sending time of the calculation result notifying packet received at S20 is $T_{MS}$, the value stored in the inter-node delay time is $T_D$, and that slave is the m-th slave when counted from the master, a time correction value $\Delta T$ at that slave is $$\Delta T = T_{MS} + T_{SD} + mT_D - T_{SR}.$$

Inside of the slave, the calculation result notifying packet received by the receiving unit 6 is inputted to the time synchronization controlling unit 1 through the received data processing unit 2, and the time synchronization controlling unit 1 extracts the master sending time and the inter-node delay time of the calculation result notifying packet and calculates the time correction value according to the above expression.

Here, the received time of the measurement packet $T_{SR}$ at the slave is used for calculating the time correction value; instead, the sending time of the measurement packet at the slave can be used for calculating the time correction value.

Next, the slave adjusts the internal clock of the own node using the time correction value calculated at S21 (S22).

The adjustment of the internal clock is completed by adding $\Delta T$ to the time of the internal clock at an arbitrary timing.

As for the internal process of the slave, the time synchronization controlling unit 1 issues a command to adjust the internal clock using the correction value $\Delta T$ to the clock controlling unit 5. On receiving the command to adjust the internal clock, the clock controlling unit 5 carries out a process to add the correction value $\Delta T$ to the current time of the internal clock 4.

Up to the above process, the time synchronizing process to synchronize the internal clock of the slave to the internal clock (reference clock) of the master is completed.

As has been discussed, at the time of calculating the time correction value, the calculation is done using the actual measured values for the time required for relay processing in each slave; therefore, it is possible to obtain the correction value with a high precision without influence of the relay processing time of the slave.

As discussed above, in the present embodiment, the master node apparatus including the following means has been explained:

(a) means to send the measurement packet and obtain the sending time;

(b) means to receive the measurement packet and obtain the received time;

(c) means to send the delay calculating packet;

(d) means to receive the delay calculating packet and extract the relay delay additive value;

(e) means to calculate the average value of the inter-node apparatus transmission delay time using the above sending time, the received time, the relay delay additive value, and the number of nodes within the ring; and (c) means to store the above sending time and the average value of the inter-node apparatus transmission delay time in the calculation result notifying packet and send the packet.

Further, in the present embodiment, the master node apparatus including the following means has been also explained:

(a) means to receive the measurement packet, send after repeating to the next node, and obtain the received time and the sending time;

(b) means to receive the delay calculating packet, extract the relay delay additive value, and store the value;

(c) means to add the difference between the sending time and the received time to the relay delay additive value;

(d) means to store the added relay delay additive value in the delay calculating packet and send the packet;

(e) means to receive the calculation result notifying packet and extract the master sending time and the inter-node delay time;

(f) means to calculate the time correction value at the own node from the master sending time, the relay delay additive value, the inter-node delay time, the number of nodes existing on the route from the master to the own node, and the received time of the measurement packet obtained by the own node; and (g) means to adjust the internal clock of the own node using the time correction calculated above.

Finally, the configuration example of the time synchronizing apparatus 100 shown in the first and second embodiments will be explained.

Figure 18:
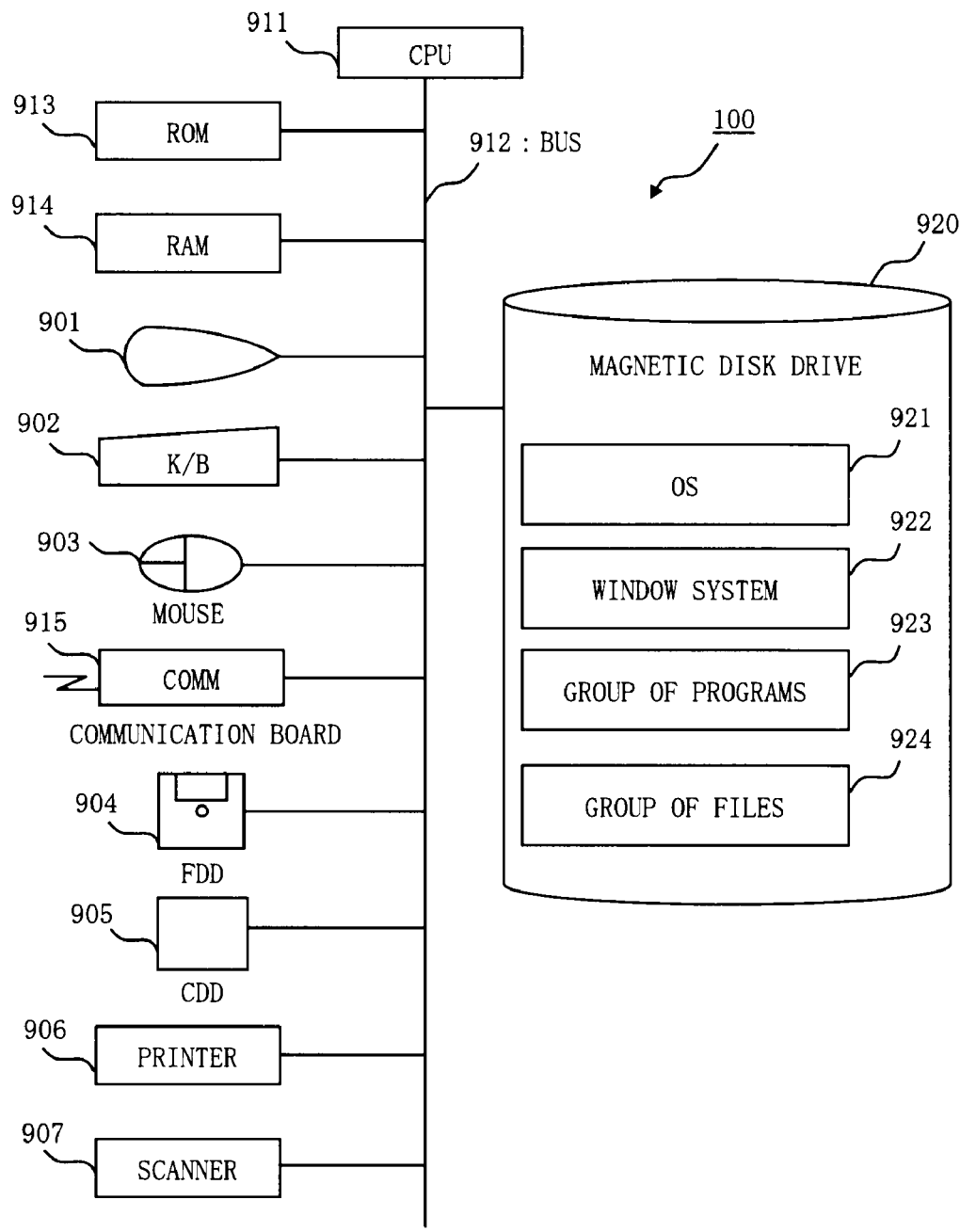
FIG. 18 shows a configuration example of hardware of the time synchronizing apparatus according to the first and second embodiments.

FIG. 18 shows an example of hardware resource of the time synchronizing apparatus 100 shown in the first and second embodiments. Here, the configuration of FIG. 18 shows merely one of examples of hardware configuration of the time synchronizing apparatus 100; and the hardware configuration of the time synchronizing apparatus 100 is not limited to the configuration shown in FIG. 18, but can be another configuration.

In FIG. 18, the time synchronizing apparatus 100 includes a CPU 911 (Central Processing Unit; also called as a central processing device, a processing device, an operation device, a micro-processor, a micro-computer, and a processor) executing programs. The CPU 911 is connected via a bus 912 to for example, a ROM (Read Only Memory) 913, a RAM (Random Access Memory) 914, a communication board 915, a display device 901, a keyboard 902, a mouse 903, and a magnetic disk drive 920, and controls these hardware devices. Moreover, the CPU 911 can be connected to a FDD 904 (Flexible Disk Drive), a compact disk drive 905 (CDD), a printer device 906, and a scanner device 907. Further, instead of the magnetic disk drive 920, it can be connected to a memory device such as an optical disk drive, and a memory card reader/writer device, etc.

The RAM 914 is an example of a volatile memory. Storage medium of the ROM 913, the FDD 904, the CDD 905, and the magnetic disk drive 920 are examples of a non-volatile memory. These are examples of the memory device or the memory unit.

The communication board 915, the keyboard 902, the scanner device 907, and the FDD 904, etc. are examples of the inputting unit and the inputting device.

Further, the communication board 915, the display device 901, and the printer device 906, etc. are examples of the outputting unit and the outputting device.

The communication board 915 is, as shown in FIG. 3, connected to the ring type network. Further, the communication board 915 can be connectable to, for example, a LAN (local area network), the Internet, a WAN (wide area network), etc.

The magnetic disk drive 920 stores an operating system 921 (OS), a window system 922, a group of programs 923, and a group of files 924. Programs of the group of programs 923 are executed by the CPU 911, the operating system 921, and the window system 922.

The above group of programs 923 store programs executing functions explained in the first and second embodiments as "-- unit" and "-- means". The programs are read and executed by the CPU 911.

The group of files 924 stores information, data, signal values, variable values, or parameters showing processed result explained in the first and second embodiments as "determination of --", "operation of --", "calculation of --", "comparison of --", "obtainment of --", "update of --", "setting of --", and "registration of --", etc. as each item of "-- file" or "-- database". "-- file" or "-- database" is stored by the recording medium such as disks or memories, etc. The information, data, signal values, variable values, or parameters stored in the storage medium such as disks or memories, etc. are read by the CPU 911 via the reading/writing circuit to a main memory or a cache memory, and used for the operation of the CPU such as extraction, search, reference, comparison, operation, calculation, processing, edition, output, print, and display, etc. During the operation of the CPU of extraction, search, reference, comparison, operation, calculation, processing, edition, output, print, and display, the information, data, signal values, variable values, or parameters are temporarily stored in the main memory, a register, the cache memory, and a buffer memory, etc.

Further, an arrow part of the flowcharts explained in the first and second embodiments mainly shows input/output of data or signals, and data or signal values are stored in recording medium such as a memory of the RAM 914, a flexible disk of the FDD 904, a compact disk of the CDD 905, a magnetic disk of the magnetic disk drive 920, and other optical disk, mini disk, DVD, etc. Further, data or signals are transmitted online by the bus 912, signal lines, cables, and other transmission medium.

Further, "-- unit" and "-- means" explained in the first and second embodiments can be "-- circuit", "-- device", and "-- equipment", and can be also "-- step", "-- procedure", and "-- process". That is, "-- unit" and "-- means" can be implemented by the firmware stored in the ROM 913. Or it is also possible to implement only by software, only by hardware such as elements, devices, boards, and wirings, etc., or a combination of software and hardware, and a combination further with firmware. The firmware and software are stored as programs in the recording medium such as the magnetic disk, the flexible disk, the optical disk, the compact disk, the mini disk, the DVD, etc. The programs are read by the CPU 911, and executed by the CPU 911. That is, the programs are to function a computer as "-- unit" and "-- means" in the first and second embodiments. Or the programs are to have the computer execute procedures or methods of "-- unit" and "-- means" in the first and second embodiments.

Like this, the time synchronizing apparatus 100 shown in the first and second embodiments is a computer including the CPU being the processing unit, memories and magnetic disks, etc. being the storage medium, a keyboard, a mouse, a communication board, etc. being the inputting devices, a display device, a communication board, etc. being the outputting device, and, as discussed above, is to implement functions shown as "-- unit" and "-- means" using these processing unit, the storage device, the inputting device, and the outputting device.

EXPLANATION OF SIGNS

1: a time synchronization controlling unit; 2: a received data processing unit; 3: a sending data generating unit; 4: an internal clock; 5: a clock controlling unit; 6: a receiving unit; 7: a repeater; 8: a sending unit; and 100: a time synchronizing apparatus.

The invention claimed is:

1. A communication system, in which a master node apparatus having a reference clock and a plurality of slave node apparatuses each having an internal clock are connected to form a ring, for circulating a packet among a plurality of node apparatuses by transferring the packet according to a packet transferring order prescribed for each node apparatus, wherein the master node apparatus
sends a measurement packet to a slave node apparatus
being a receiver according to the packet transferring order, and receives the measurement packet which has been circulated among the plurality of slave node apparatuses;

according to time-keeping of the reference clock, stores a sending time of the measurement packet and a received time of the measurement packet;

generates a measurement result notifying packet showing the sending time of the measurement packet and the received time of the measurement packet; and sends the measurement result notifying packet generated to a slave node apparatus being a receiver according to the packet transferring order, and wherein each of the plurality of slave node apparatuses receives the measurement packet from a node apparatus being a sender according to the packet transferring order, and sends the measurement packet received to a node apparatus being a receiver according to the packet transferring order;

according to time-keeping of the internal clock, stores at least either of a received time of the measurement packet and a sending time of the measurement packet; and receives the measurement result notifying packet from a node apparatus being a sender according to the packet transferring order; calculates a time correction value using the sending time of the measurement packet and the received time of the measurement packet shown in the measurement result notifying packet received, at least either of the received time of the measurement packet stored and the sending time of the measurement packet stored, a total number of node apparatuses, and a difference between an order of the slave node apparatus and an order of the master node apparatus according to the packet transferring order; and corrects a time of the internal clock using the time correction value calculated.

2. The communication system of claim 1, wherein each of the plurality of slave node apparatuses according the time-keeping of the internal clock, stores the received time of the measurement packet; and calculates the time correction value using the received time of the measurement packet stored, the sending time of the measurement packet and the received time of the measurement packet shown in the measurement result notifying packet received, the number of node apparatuses, and the difference between the order of the slave node apparatus and the order of the master node apparatus according to the packet transferring order; and corrects the time of the internal clock using the time correction value calculated.

3. The communication system of claim 1, wherein the master node apparatus sends a structure confirming packet including a number-of-node count value for counting the total number of the node apparatuses to the slave node apparatus being the receiver according to the packet transferring order;

receives the structure confirming packet which has been circulated among the plurality of slave node apparatuses; and includes the number-of-node count value included in the structure confirming packet received as the total number of the node apparatuses in at least either of the measurement packet and the measurement result notifying packet, and sends the measurement packet and the measurement result notifying packet to the slave node apparatus being the receiver according to the packet transferring order, and wherein each of the plurality of slave node apparatuses receives the structure confirming packet from the node apparatus being the sender according to the packet transferring order; counts up the number-of-node count value included in the structure confirming packet, and sends the structure confirming packet including the number-of-node count value after counting up to the node apparatus being the receiver according to the packet transferring order.

4. A communication system, in which a master node apparatus having a reference clock and a plurality of slave node apparatuses each having an internal clock are connected to form a ring, for circulating a packet among a plurality of node apparatuses by transferring the packet according to a packet transferring order prescribed for each of the plurality of node apparatuses, wherein the master node apparatus sends a measurement packet to a slave node apparatus being a receiver according to the packet transferring order; and receives the measurement packet which has been circulated among the plurality of slave node apparatuses;

according to time-keeping of the reference clock, stores a sending time of the measurement packet and a received time of the measurement packet;

sends a delay calculating packet for obtaining a total sum of relay delay time at the plurality of slave node apparatuses to the slave node apparatus being the receiver according to the packet transferring order; and receives the delay calculating packet which has been circulated among the plurality of slave node apparatuses;

calculates an inter-node apparatus transmission delay time based on the total sum of the relay delay time at the plurality of slave node apparatuses shown in the delay calculating packet, the sending time of the measurement packet stored and the received time of the measurement packet stored, and a total number of node apparatuses;

generates a calculation result notifying packet showing the sending time of the measurement packet stored and the inter-node apparatus transmission delay time calculated; and sends the calculation result notifying packet generated to the slave node apparatus being the receiver according to the packet transferring order, wherein each of the plurality of slave node apparatuses receives the measurement packet from a node apparatus being a sender according to the packet transferring order; and sends the measurement packet received to a node apparatus being a receiver according to the packet transferring order;

according to time-keeping of the internal clock, stores a received time of the measurement packet and a sending time of the measurement packet;

receives the delay calculating packet from the node apparatus being the sender according to the packet transferring order; obtains an accumulated value of relay delay time at other preceding slave node apparatus according to the packet transferring order included in the delay calculating packet; and stores the accumulated value of the relay delay time obtained;

adds a time of a difference between the received time of the measurement packet stored and the sending time of the measurement packet stored to the accumulated value of the relay delay time included in the delay calculating packet to make a new accumulated value of the relay delay time; and sends the delay calculating packet including the new accumulated value of the relay delay time to the node apparatus being the receiver according to the packet transferring order;

receives the calculation result notifying packet from the node apparatus being the sender according to the packet transferring order; calculates a time correction value using the sending time of the measurement packet and the inter-node apparatus transmission delay time shown in the calculation result notifying packet received, at least either of the received time of the measurement packet stored and the sending time of the measurement packet stored, the accumulated value of the relay delay time stored, and a difference between an order of the slave node apparatus and an order of the master node apparatus according to the packet transferring order; and corrects a time of the internal clock using the time correction value calculated.

5. The communication system of claim 4, wherein each of the plurality of slave node apparatuses calculates the time correction value using the received time of the measurement packet stored, the sending time of the measurement packet and the inter-node apparatus transmission delay time shown in the calculation result notifying packet, the accumulated value of the relay delay time stored, and the difference between the order of the slave node apparatus and the order of the master node apparatus according to the packet transferring order.

6. A management apparatus having a reference clock, forming a circulation route of a packet with a plurality of communication apparatuses, and circulating the packet on the circulation route according to a packet transferring order prescribed for each of the apparatuses, the management apparatus comprising:

a measurement packet sending unit sending a measurement packet to a communication apparatus being a receiver according to the packet transferring order;

a measurement packet receiving unit receiving the measurement packet which has been circulated among the plurality of communication apparatuses;

a time memory unit, according to time-keeping of the reference clock, storing a sending time of the measurement packet by the measurement packet sending unit and a received time of the measurement packet by the measurement packet receiving unit;

a measurement result notifying packet generating unit generating a measurement result notifying packet showing the sending time of the measurement packet and the received time of the measurement packet stored in the time memory unit; and a measurement result notifying packet sending unit sending the measurement result notifying packet generated by the measurement result notifying packet generating unit to the communication apparatus being the receiver according to the packet transferring order.

7. A management apparatus having a reference clock, forming a circulation route of a packet with a plurality of communication apparatuses, and circulating the packet on the circulation route according to a packet transferring order prescribed for each of the apparatuses, the management apparatus comprising:

a measurement packet sending unit sending a measurement packet to a communication apparatus being a receiver according to the packet transferring order;

a measurement packet receiving unit receiving the measurement packet which has been circulated among the plurality of communication apparatuses;

a time memory unit, according to time-keeping of the reference clock, storing a sending time of the measurement packet by the measurement packet sending unit and a received time of the measurement packet by the measurement packet receiving unit;

a delay calculating packet sending unit sending a delay calculating packet for obtaining a total sum of relay delay time at the plurality of communication apparatuses to the communication apparatus being the receiver according to the packet transferring order;

a delay calculating packet receiving unit receiving the delay calculating packet which has been circulated among the plurality of communication apparatuses included in the circulation route, and in which the relay delay time at each of the plurality of communication apparatuses is accumulated and the total sum of relay delay time at the plurality of communication apparatuses is shown;

a transmission delay time calculating unit calculating an inter-communication apparatus transmission delay time based on the total sum of relay delay time at the plurality of communication apparatuses shown in the delay calculating packet received by the delay calculating packet receiving unit, the sending time of the measurement packet and the received time of the measurement packet stored by the time memory unit, and a total number of apparatuses included in the circulation route;

a calculation result notifying packet generating unit generating a calculation result notifying packet showing the sending time of the measurement packet stored by the time memory unit and the inter-communication apparatus transmission delay time calculated by the transmission delay time calculating unit; and a calculation result notifying packet sending unit sending the calculation result notifying packet generated by the calculation result notifying packet generating unit to the communication apparatus being the receiver according to the packet transferring order.

8. A communication apparatus having an internal clock, forming a circulation route of a packet with a management apparatus having a reference clock and at least one other communication apparatus, and circulating the packet on the circulation route according to a packet transferring order prescribed for each of the apparatuses, the communication apparatus comprising:

a measurement packet receiving unit receiving a measurement packet sent by the management apparatus from an apparatus being a sender according to the packet transferring order;

a measurement packet sending unit sending the measurement packet received by the measurement packet receiving unit to an apparatus being a receiver according to the packet transferring order;

a time memory unit, according to time-keeping of the internal clock, storing at least either of a received time of the measurement packet by the measurement packet receiving unit and a sending time of the measurement packet by the measurement packet sending unit;

a measurement result notifying packet receiving unit receiving a measurement result notifying packet showing, according to time-keeping of the reference clock of the management apparatus, a sending time of the measurement packet at the management apparatus and a received time of the measurement packet which has been circulated round the circulation route at the management apparatus;

a time correction value calculating unit calculating a time correction value using the sending time of the measurement packet and the received time of the measurement packet shown in the measurement result notifying packet, at least either of the received time of the measurement packet and the sending time of the measurement packet stored by the time memory unit, a total number of apparatuses included in the circulation route, and a difference of an order with the management apparatus according to the packet transferring order; and a clock controlling unit correcting a time of the internal clock using the time correction value calculated by the time correction value calculating unit.

9. The communication apparatus of claim 8, wherein the time memory unit, according to the time-keeping of the internal clock, stores the received time of the measurement packet by the measurement packet receiving unit, and wherein the time correction value calculating unit calculates the time correction value using the received time of the measurement packet stored by the time memory unit, the sending time of the measurement packet and the received time of the measurement packet shown in the measurement result notifying packet, the total number of apparatuses included in the circulation route, and the difference of the order with the management apparatus according to the packet transferring order.

10. A communication apparatus having an internal clock, forming a circulation route of a packet with a management apparatus having a reference clock and at least one other communication apparatus, and circulating the packet on the circulation route according to a packet transferring order prescribed for each of the apparatuses, the communication apparatus comprising:

a measurement packet receiving unit receiving a measurement packet sent by the management apparatus from an apparatus being a sender according to the packet transferring order;

a measurement packet sending unit sending the measurement packet received by the measurement packet receiving unit to an apparatus being a receiver according to the packet transferring order;

a time memory unit, according to time-keeping of the internal clock, storing a received time of the measurement packet by the measurement packet receiving unit and a sending time of the measurement packet by the measurement packet sending unit;

a delay calculating packet receiving unit receiving a delay calculating packet including an accumulated value of relay delay time of other preceding communication apparatus according to the packet transferring order from the apparatus being the sender according to the packet transferring order;

a relay delay time memory unit obtaining the accumulated value of the relay delay time included in the delay calculating packet received by the delay calculating packet receiving unit, and storing the accumulated value of the relay delay time obtained;

a delay calculating packet updating unit adding a time of a difference between the received time of the measurement packet and the sending time of the measurement packet stored by the time memory unit to the accumulated value of the relay delay time included in the delay calculating packet to make a new accumulated value of the relay delay time, and storing the new accumulated value of the relay delay time in the delay calculating packet;

a delay calculating packet sending unit sending the delay calculating packet in which the new accumulated value of the relay delay time is stored by the delay calculating packet updating unit to the apparatus being the receiver according to the packet transferring order;

a calculation result notifying packet receiving unit receiving a calculation result notifying packet showing, according to time-keeping of the reference clock of the management apparatus, a sending time of the measurement packet at the management apparatus and an inter-communication apparatus transmission delay time;

a time correction value calculating unit calculating a time correction value using the sending time of the measurement packet and the inter-communication apparatus transmission delay time shown in the calculation result notifying packet, at least either of the received time of the measurement packet and the sending time of the measurement packet stored by the time memory unit, the accumulated value of the relay delay time stored by the relay delay time memory unit, a total number of apparatuses included in the circulation route, and a difference of an order with the management apparatus according to the packet transferring order; and a clock controlling unit correcting a time of the internal clock using the time correction value calculated by the time correction value calculating unit.

11. The communication apparatus of claim 10, wherein the time memory unit, according to the time-keeping of the internal clock, stores the received time of the measurement packet by the measurement packet receiving unit, and wherein the time correction value calculating unit calculates the time correction value using the received time of the measurement packet stored by the time memory unit, the sending time of the measurement packet and the inter-communication apparatus transmission delay time shown in the calculation result notifying packet, the accumulated value of the relay delay time stored by the relay delay time memory unit, the total number of apparatuses included in the circulation route, and the difference of the order with the management apparatus according to the packet transferring order.

12. A non-transitory computer readable storage medium having stored thereon a computer program for a management apparatus having a reference clock, forming a circulation route of a packet with a plurality of communication apparatuses, and circulating the packet on the circulation route according to a packet transferring order prescribed for each of the apparatuses which when executed by a computer causes the computer to execute a method comprising:

a measurement packet sending process sending a measurement packet to a communication apparatus being a receiver according to the packet transferring order;

a measurement packet receiving process receiving the measurement packet which has been circulated among the plurality of communication apparatuses;

a time memory process, according to time-keeping of the reference clock, storing a sending time of the measurement packet by the measurement packet sending process and a received time of the measurement packet by the measurement packet receiving process;

a measurement result notifying packet generating process generating a measurement result notifying packet showing the sending time of the measurement packet and the received time of the measurement packet stored by the time memory process; and a measurement result notifying packet sending process sending the measurement result notifying packet generated by the measurement result notifying packet generating process to the communication apparatus being the receiver according to the packet transferring order.

13. A non-transitory computer readable storage medium having stored thereon a computer program for a management apparatus having a reference clock, forming a circulation route of a packet with a plurality of communication apparatuses, and circulating the packet on the circulation route according to a packet transferring order prescribed for each of the apparatuses which when executed by a computer causes the computer to execute a method comprising:
   a measurement packet sending process sending a measurement packet to a communication apparatus being a receiver according to the packet transferring order;
   a measurement packet receiving process receiving the measurement packet which has been circulated among the plurality of communication apparatuses;
   a time memory process, according to time-keeping of the reference clock, storing a sending time of the measurement packet by the measurement packet sending process and a received time of the measurement packet by the measurement packet receiving process;
   a delay calculating packet sending process sending a delay calculating packet for obtaining a total sum of relay delay time at the plurality of communication apparatuses to the communication apparatus being the receiver according to the packet transferring order;
   a delay calculating packet receiving process receiving the delay calculating packet which has been circulated among the plurality of communication apparatuses included in the circulation route, and in which the relay delay time at each of the plurality of communication apparatuses is accumulated and the total sum of relay delay time at the plurality of communication apparatuses is shown;
   a transmission delay time calculating process calculating an inter-communication apparatus transmission delay time based on the total sum of relay delay time at the plurality of communication apparatuses shown in the delay calculating packet received by the delay calculating packet receiving process, the sending time of the measurement packet and the received time of the measurement packet stored by the time memory process, and a total number of apparatuses included in the circulation route;
   a calculation result notifying packet generating process generating a calculation result notifying packet showing the sending time of the measurement packet stored by the time memory process and the inter-communication apparatus transmission delay time calculated by the transmission delay time calculating process; and
   a calculation result notifying packet sending process sending the calculation result notifying packet generated by the calculation result notifying packet generating process to the communication apparatus being the receiver according to the packet transferring order.

14. A non-transitory computer readable storage medium having stored thereon a computer program for a communication apparatus having an internal clock, forming a circulation route of a packet with a management apparatus having a reference clock and at least one other communication apparatus, and circulating the packet on the circulation route according to a packet transferring order prescribed for each of the apparatuses which when executed by a computer causes the computer to execute a method comprising:
   a measurement packet receiving process receiving a measurement packet sent by the management apparatus from an apparatus being a sender according to the packet transferring order;
   a measurement packet sending process sending the measurement packet received by the measurement packet receiving process to an apparatus being a receiver according to the packet transferring order;
   a time memory process, according to time-keeping of the internal clock, storing at least either of a received time of the measurement packet by the measurement packet receiving process and a sending time of the measurement packet by the measurement packet sending process;
   a measurement result notifying packet receiving process receiving a measurement result notifying packet showing, according to time-keeping of the reference clock of the management apparatus, a sending time of the measurement packet at the management apparatus and a received time of the measurement packet which has been circulated round the circulation route at the management apparatus;
   a time correction value calculating process calculating a time correction value using the sending time of the measurement packet and the received time of the measurement packet shown in the measurement result notifying packet, at least either of the received time of the measurement packet and the sending time of the measurement packet stored by the time memory process, a total number of apparatuses included in the circulation route, and a difference of an order with the management apparatus according to the packet transferring order; and
   a clock controlling process correcting a time of the internal clock using the time correction value calculated by the time correction value calculating process.

15. A non-transitory computer readable storage medium having stored thereon a computer program for a communication apparatus having an internal clock, forming a circulation route of a packet with a management apparatus having a reference clock and at least one other communication apparatus, and circulating the packet on the circulation route according to a packet transferring order prescribed for each of the apparatuses which when executed by a computer causes the computer to execute a method comprising:
   a measurement packet receiving process receiving a measurement packet sent by the management apparatus from an apparatus being a sender according to the packet transferring order;
   a measurement packet sending process sending the measurement packet received by the measurement packet receiving process to an apparatus being a receiver according to the packet transferring order;
   a time memory process, according to time-keeping of the internal clock, storing a received time of the measurement packet by the measurement packet receiving process and a sending time of the measurement packet by the measurement packet sending process;
   a delay calculating packet receiving process receiving a delay calculating packet including an accumulated value of relay delay time of other preceding communication apparatus according to the packet transferring order from the apparatus being the sender according to the packet transferring order;
   a relay delay time memory process obtaining the accumulated value of the relay delay time included in the delay calculating packet received by the delay calculating packet receiving process, and storing the accumulated value of the relay delay time obtained;

a delay calculating packet updating process adding a time of a difference between the received time of the measurement packet and the sending time of the measurement packet stored by the time memory process to the accumulated value of the relay delay time included in the delay calculating packet to make a new accumulated value of the relay delay time, and storing the new accumulated value of the relay delay time in the delay calculating packet;

a delay calculating packet sending process sending the delay calculating packet in which the new accumulated value of the relay delay time is stored by the delay calculating packet updating process to an apparatus being the receiver according to the packet transferring order;

a calculation result notifying packet receiving process receiving a calculation result notifying packet showing, according to time-keeping of the reference clock of the management apparatus, a sending time of the measurement packet at the management apparatus and an inter-communication apparatus transmission delay time;

a time correction value calculating process calculating a time correction value using the sending time of the measurement packet and the inter-communication apparatus transmission delay time shown in the calculation result notifying packet, at least either of the received time of the measurement packet and the sending time of the measurement packet stored by the time memory process, the accumulated value of the relay delay time stored by the relay delay time memory process, a total number of apparatuses included in the circulation route, and a difference of an order with the management apparatus according to the packet transferring order; and a clock controlling process correcting a time of the internal clock using the time correction value calculated by the time correction value calculating process.

* * * * *